(12) United States Patent
Takahashi

(10) Patent No.: US 6,973,522 B1
(45) Date of Patent: Dec. 6, 2005

(54) MICROCOMPUTER WITH PROGRAM-REVISION ABILITY

(75) Inventor: Hiroyuki Takahashi, Tochigi (JP)

(73) Assignee: PENTAX Corporation, Tokyo (JP)

( * ) Notice: Subject to any disclaimer, the term of this patent is extended or adjusted under 35 U.S.C. 154(b) by 345 days.

(21) Appl. No.: 09/635,524

(22) Filed: Aug. 9, 2000

(30) Foreign Application Priority Data

Aug. 10, 1999 (JP) .................................. 11-226584

(51) Int. Cl.[7] .......................... G06F 13/24; G06F 9/00; G01R 31/28
(52) U.S. Cl. .......................... 710/269; 714/8; 714/726; 712/220
(58) Field of Search .................. 381/119; 712/248, 712/224, 244, 240, 39, 51; 713/2; 714/726, 714/8, 6, 34, 35, 39; 365/189.02; 710/266, 710/269

(56) References Cited

U.S. PATENT DOCUMENTS

| | | | | |
|---|---|---|---|---|
| 4,610,000 A | * | 9/1986 | Lee .......................... | 365/189.02 |
| 4,831,517 A | * | 5/1989 | Crouse et al. .................. | 714/8 |
| 5,357,627 A | * | 10/1994 | Miyazawa et al. ............. | 714/6 |
| 5,561,493 A | | 10/1996 | Takahashi | |
| 5,809,345 A | | 9/1998 | Numako | |
| 6,154,834 A | * | 11/2000 | Neal et al. .................. | 712/248 |
| 6,237,120 B1 | * | 5/2001 | Shimada et al. ............ | 714/726 |
| 6,434,695 B1 | * | 8/2002 | Esfahani et al. ............... | 713/2 |

* cited by examiner

Primary Examiner—Glenn A. Auve
Assistant Examiner—Christopher E. Lee
(74) Attorney, Agent, or Firm—Greenblum & Bernstein, P.L.C.

(57) ABSTRACT

A microcomputer has a ROM with pre-stored programs, a RAM storing a revision program for executing an interruption-processing, and a program counter in which an address is successively renewed during an execution of the ROM-stored programs. A first register stores a comparison address corresponding to an optional address of the ROM-stored programs, at which an interruption-processing should be executed to virtually revise the ROM-stored programs. A second register stores a vector address data corresponding to a head address of the revision program. An address comparator compares the comparison address data with a renewed address of the program counter. A controller/calculator makes an access to the head address of the revision program, corresponding to the vector address data of the second register, when there is a coincidence between the comparison address data and the renewed address of the program counter, resulting in an execution of the interruption-processing in accordance with the revision program.

7 Claims, 26 Drawing Sheets

FIG. 4

CIRCUIT ELEMENT $48_0$

CAR 50

| $CA0_{15}$ | $CA0_{14}$ | $CA0_{13}$ | $CA0_{12}$ | $CA0_{11}$ | $CA0_{10}$ | $CA0_{09}$ | $CA0_{08}$ |
|---|---|---|---|---|---|---|---|
| $CA0_{07}$ | $CA0_{06}$ | $CA0_{05}$ | $CA0_{04}$ | $CA0_{03}$ | $CA0_{02}$ | $CA0_{01}$ | $CA0_{00}$ |

ACIAR 68

FE0

VAR 70

| $VA0_{15}$ | $VA0_{14}$ | $VA0_{13}$ | $VA0_{12}$ | $VA0_{11}$ | $VA0_{10}$ | $VA0_{09}$ | $VA0_{08}$ |
|---|---|---|---|---|---|---|---|
| $VA0_{07}$ | $VA0_{06}$ | $VA0_{05}$ | $VA0_{04}$ | $VA0_{03}$ | $VA0_{02}$ | $VA0_{01}$ | $VA0_{00}$ |

FIG. 5

CIRCUIT ELEMENT $48_1$

CAR 50

| $CA1_{15}$ | $CA1_{14}$ | $CA1_{13}$ | $CA1_{12}$ | $CA1_{11}$ | $CA1_{10}$ | $CA1_{09}$ | $CA1_{08}$ |
|---|---|---|---|---|---|---|---|
| $CA1_{07}$ | $CA1_{06}$ | $CA1_{05}$ | $CA1_{04}$ | $CA1_{03}$ | $CA1_{02}$ | $CA1_{01}$ | $CA1_{00}$ |

ACIAR 68

FE1

VAR 70

| $VA1_{15}$ | $VA1_{14}$ | $VA1_{13}$ | $VA1_{12}$ | $VA1_{11}$ | $VA1_{10}$ | $VA1_{09}$ | $VA1_{08}$ |
|---|---|---|---|---|---|---|---|
| $VA1_{07}$ | $VA1_{06}$ | $VA1_{05}$ | $VA1_{04}$ | $VA1_{03}$ | $VA1_{02}$ | $VA1_{01}$ | $VA1_{00}$ |

FIG. 6

CIRCUIT ELEMENT $48_2$

CAR 50

| $CA2_{15}$ | $CA2_{14}$ | $CA2_{13}$ | $CA2_{12}$ | $CA2_{11}$ | $CA2_{10}$ | $CA2_{09}$ | $CA2_{08}$ |
|---|---|---|---|---|---|---|---|
| $CA2_{07}$ | $CA2_{06}$ | $CA2_{05}$ | $CA2_{04}$ | $CA2_{03}$ | $CA2_{02}$ | $CA2_{01}$ | $CA2_{00}$ |

ACIAR 68

| FE2 |
|---|

VAR 70

| $VA2_{15}$ | $VA2_{14}$ | $VA2_{13}$ | $VA2_{12}$ | $VA2_{11}$ | $VA2_{10}$ | $VA2_{09}$ | $VA2_{08}$ |
|---|---|---|---|---|---|---|---|
| $VA2_{07}$ | $VA2_{06}$ | $VA2_{05}$ | $VA2_{04}$ | $VA2_{03}$ | $VA2_{02}$ | $VA2_{01}$ | $VA2_{00}$ |

FIG. 7

CIRCUIT ELEMENT $48_3$

CAR 50

| $CA3_{15}$ | $CA3_{14}$ | $CA3_{13}$ | $CA3_{12}$ | $CA3_{11}$ | $CA3_{10}$ | $CA3_{09}$ | $CA3_{08}$ |
|---|---|---|---|---|---|---|---|
| $CA3_{07}$ | $CA3_{06}$ | $CA3_{05}$ | $CA3_{04}$ | $CA3_{03}$ | $CA3_{02}$ | $CA3_{01}$ | $CA3_{00}$ |

ACIAR 68

| FE3 |
|---|

VAR 70

| $VA3_{15}$ | $VA3_{14}$ | $VA3_{13}$ | $VA3_{12}$ | $VA3_{11}$ | $VA3_{10}$ | $VA3_{09}$ | $VA3_{08}$ |
|---|---|---|---|---|---|---|---|
| $VA3_{07}$ | $VA3_{06}$ | $VA3_{05}$ | $VA3_{04}$ | $VA3_{03}$ | $VA3_{02}$ | $VA3_{01}$ | $VA3_{00}$ |

FIG. 8

CIRCUIT ELEMENT $48_4$

CAR 50

| $CA4_{15}$ | $CA4_{14}$ | $CA4_{13}$ | $CA4_{12}$ | $CA4_{11}$ | $CA4_{10}$ | $CA4_{09}$ | $CA4_{08}$ |
|---|---|---|---|---|---|---|---|
| $CA4_{07}$ | $CA4_{06}$ | $CA4_{05}$ | $CA4_{04}$ | $CA4_{03}$ | $CA4_{02}$ | $CA4_{01}$ | $CA4_{00}$ |

ACIAR 68

FE4

VAR 70

| $VA4_{15}$ | $VA4_{14}$ | $VA4_{13}$ | $VA4_{12}$ | $VA4_{11}$ | $VA4_{10}$ | $VA4_{09}$ | $VA4_{08}$ |
|---|---|---|---|---|---|---|---|
| $VA4_{07}$ | $VA4_{06}$ | $VA4_{05}$ | $VA4_{04}$ | $VA4_{03}$ | $VA4_{02}$ | $VA4_{01}$ | $VA4_{00}$ |

FIG. 9

CIRCUIT ELEMENT $48_5$

CAR 50

| $CA5_{15}$ | $CA5_{14}$ | $CA5_{13}$ | $CA5_{12}$ | $CA5_{11}$ | $CA5_{10}$ | $CA5_{09}$ | $CA5_{08}$ |
|---|---|---|---|---|---|---|---|
| $CA5_{07}$ | $CA5_{06}$ | $CA5_{05}$ | $CA5_{04}$ | $CA5_{03}$ | $CA5_{02}$ | $CA5_{01}$ | $CA5_{00}$ |

ACIAR 68

FE5

VAR 70

| $VA5_{15}$ | $VA5_{14}$ | $VA5_{13}$ | $VA5_{12}$ | $VA5_{11}$ | $VA5_{10}$ | $VA5_{09}$ | $VA5_{08}$ |
|---|---|---|---|---|---|---|---|
| $VA5_{07}$ | $VA5_{06}$ | $VA5_{05}$ | $VA5_{04}$ | $VA5_{03}$ | $VA5_{02}$ | $VA5_{01}$ | $VA5_{00}$ |

FIG. 10

CIRCUIT ELEMENT $48_6$

CAR 50

| $CA6_{15}$ | $CA6_{14}$ | $CA6_{13}$ | $CA6_{12}$ | $CA6_{11}$ | $CA6_{10}$ | $CA6_{09}$ | $CA6_{08}$ |
|---|---|---|---|---|---|---|---|
| $CA6_{07}$ | $CA6_{06}$ | $CA6_{05}$ | $CA6_{04}$ | $CA6_{03}$ | $CA6_{02}$ | $CA6_{01}$ | $CA6_{00}$ |

ACIAR 68

| FE6 |
|---|

VAR 70

| $VA6_{15}$ | $VA6_{14}$ | $VA6_{13}$ | $VA6_{12}$ | $VA6_{11}$ | $VA6_{10}$ | $VA6_{09}$ | $VA6_{08}$ |
|---|---|---|---|---|---|---|---|
| $VA6_{07}$ | $VA6_{06}$ | $VA6_{05}$ | $VA6_{04}$ | $VA6_{03}$ | $VA6_{02}$ | $VA6_{01}$ | $VA6_{00}$ |

FIG. 11

CIRCUIT ELEMENT $48_7$

CAR 50

| $CA7_{15}$ | $CA7_{14}$ | $CA7_{13}$ | $CA7_{12}$ | $CA7_{11}$ | $CA7_{10}$ | $CA7_{09}$ | $CA7_{08}$ |
|---|---|---|---|---|---|---|---|
| $CA7_{07}$ | $CA7_{06}$ | $CA7_{05}$ | $CA7_{04}$ | $CA7_{03}$ | $CA7_{02}$ | $CA7_{01}$ | $CA7_{00}$ |

ACIAR 68

| FE7 |
|---|

VAR 70

| $VA7_{15}$ | $VA7_{14}$ | $VA7_{13}$ | $VA7_{12}$ | $VA7_{11}$ | $VA7_{10}$ | $VA7_{09}$ | $VA7_{08}$ |
|---|---|---|---|---|---|---|---|
| $VA7_{07}$ | $VA7_{06}$ | $VA7_{05}$ | $VA7_{04}$ | $VA7_{03}$ | $VA7_{02}$ | $VA7_{01}$ | $VA7_{00}$ |

FIG. 13

CIRCUIT ELEMENT $48_0$

ACIPR 58
FD0

ACICR 74
FC0

ACIMR 64
FM0

FIG. 14

CIRCUIT ELEMENT $48_1$

ACIPR 58
FD1

ACICR 74
FC1

ACIMR 64
FM1

FIG. 15

CIRCUIT ELEMENT $48_2$
- ACIPR 58
  - FD2
- ACICR 74
  - FC2
- ACIMR 64
  - FM2

FIG. 16

CIRCUIT ELEMENT $48_3$
- ACIPR 58
  - FD3
- ACICR 74
  - FC3
- ACIMR 64
  - FM3

FIG. 17

CIRCUIT ELEMENT $48_4$

ACIPR 58

FD4

ACICR 74

FC4

ACIMR 64

CIRCUIT ELEMENT $48_5$

ACIPR 58

FD5

ACICR 74

FC5

ACIMR 64

CIRCUIT ELEMENT $48_6$
- ACIPR 58
  - FD6
- ACICR 74
  - FC6
- ACIMR 64
  - FM6

FIG. 20

CIRCUIT ELEMENT $48_7$
- ACIPR 58
  - FD7
- ACICR 74
  - FC7
- ACIMR 64
  - FM7

MICROCOMPUTER WITH PROGRAM-REVISION ABILITY

BACKGROUND OF THE INVENTION

1. Field of the Invention

The present invention relates to a microcomputer with a program-revision ability, in which a program-storing memory cannot be easily removed from a substrate, especially a single chip microcomputer, in which all functional elements forming the microcomputer are integrally formed as a single chip.

2. Description of the Related Art

As is well known, a microcomputer is representatively composed of a central processing unit (CPU), a read-only memory (ROM) for storing various programs and constants, a random-access memory (RAM) for storing temporary data, and an input/output interface circuit (I/O), and these elements are suitably arranged on and installed in a circuit board. In a single chip microcomputer, the representative elements CPU, ROM, RAM and I/O are integrally formed as a single chip, and the programs are previously stored in the ROM, in the course of production of the single chip microcomputer. Similarly, in a microcomputer in which the ROM cannot be easily removed from the circuit board, the programs are previously stored in the ROM in the course of production of the microcomputer. Thus, after the production of these microcomputers, a revision cannot be practically made in the programs stored in the ROM.

Accordingly, during the production of the microcomputer or after the production of the microcomputer, when it is found that a revision must be made in the programs stored in the ROM, the produced microcomputers are obliged to be scrapped. Further, when the produced microcomputer is securely attached to an electronic product, this electronic product has to be scrapped.

Note, as an example of the revision of the stored programs, there may be cases where bugs are found in one of the stored programs, where an alteration is made in one of the stored programs, and where an additional program is added to the stored programs.

On the contrary, in a microcomputer in which the ROM can be removably installed in a circuit board, it is possible to easily make a revision in the stored programs, using, for example, a ROM writer. Namely, the ROM is removed from the circuit board, and is then mounted in the ROM writer for making the revision in the stored programs. After the revision is completed, the ROM is returned to and installed in the circuit board.

Note, in this specification, the term "microcomputer" is referred to as representing a microcomputer, inclusive of a single chip microcomputer, in which the removal of the ROM cannot be easily performed.

Conventionally, it is proposed that a microcomputer is associated with an electrically erasable read-only memory (EEPROM) for the purpose of making a revision in programs previously stored in a ROM of the microcomputer, as disclosed in, for example, U.S. Pat. No. 5,809,345. When a revision is made in the stored programs after the production of the microcomputer, a revisional program is written later in the EEPROM. When the microcomputer is powered ON, the revisional program is read from the EEPROM, and is then stored in a predetermined address of a RAM of the microcomputer. During the execution of the programs of the ROM, an access is made to the predetermined address of the RAM, to thereby execute the revisional program, resulting in a virtual revision of the programs of the ROM.

In particular, among the various programs stored in the ROM, there may be a program which is susceptible to breeding of bugs and/or there may be a program which needs in the future. In this case, a program-call instruction is previously written in a head of the program concerned, and an address, corresponding to the program-call instruction, is previously set in the RAM.

After the production of the microcomputer, when bugs are unfortunately found in the program concerned or when a revision must be made in the program concerned, a revisional program is written and stored in the EEPROM. Whenever the microcomputer is powered ON, the revisional program is read from the EEPROM, and is then stored in the previously-set address of the RAM.

During the execution of the programs stored in the ROM, when the program-call instruction is read, the execution of the programs of the ROM is once interrupted, and an access is made to the previously-set address of the RAM. If the revisional program is stored in the previously-set address of the RAM, the revisional program is executed, and the execution of the programs of the ROM is resumed after the execution of the revisional program is completed. On the other hand, if the revisional program is not stored in the previously-set address of the RAM, the execution of the programs of the ROM is immediately resumed. Thus, it is possible to virtually make the revision of the programs stored in the ROM.

Nevertheless, as is apparent from the foregoing, in the conventional method, a revision cannot be made at an optional location of the programs stored in the ROM, because a program-call instruction must be written in a head of a program previously selected from among the programs stored in ROM. Namely, it is impossible to make a revision in a program at a head of which the program-call instruction is not written.

SUMMARY OF THE INVENTION

Therefore, an object of the present invention is to provide a microcomputer with a program-revision ability, wherein a revision can be made in an optional location of programs stored in a ROM thereof.

In accordance with the present invention, there is provided a microcomputer including a read-only memory that stores programs, a controller/calculator that successively accesses to addresses of the programs stored in the read-only memory, to retrieve and decode an instruction from each of the accessed addresses, thereby executing a processing based on the decoded instruction, and a program counter in which an address to be accessed by the controller/calculator is successively renewed and indicated. The microcomputer comprises: at least one comparison-address-storage device that stores a comparison address data corresponding to an optional address of the programs stored in the read-only memory, at which an interruption-processing should be executed to virtually revise the programs stored in the read-only memory; a random-access memory that stores a revisional program in which the interruption-processing is programed; at least one vector-address-storage device that stores a vector address data corresponding to a head address of the revisional program stored in the random-access memory; and an address comparator that compares the comparison address data with an address successively renewed in the program counter. With this arrangement of the microcomputer, the controller/calculator makes an access to the head address of the revisional program, stored in the random-access memory, corresponding to the vector address data stored in the vector-address-storage device, when it is determined by the address comparator that there is a coincidence between the comparison address data and the renewed address of the program counter, resulting in an execution of the interruption-processing in accordance with the revisional program.

In an preferable embodiment of the invention, the microcomputer further comprises a discrimination system that discriminates whether the coincidence between the comparison address data and the renewed address of the program counter is proper, and an address-coincidence-disabling system that disables the coincidence between the comparison address data and the renewed address of the program counter.

Preferably, the microcomputer further comprises a rewritable and non-volatile memory that stores the revisional program, the comparison address data and the vector address data, and a reading/writing system that reads the revisional program, the comparison address data and the vector address data from the rewritable and non-volatile memory, and then writes these data in the random-access memory, the comparison-address-storage device and the vector-address-storage device, respectively, whenever the microcomputer is powered ON.

In the microcomputer, the address comparator may be connected to the program counter, thereby retrieving the renewed address therefrom. Also, the address comparator may be connected to an address bus extending to the program counter, to thereby retrieve the renewed address therefrom.

The microcomputer may further comprise a vector-address data setting system that reads the vector address data from the vector-address-storage device, and that is then set in the program counter, whereby the access to the head address of the revisional program by the controller/calculator is made, resulting in the execution of the interruption-processing in accordance with the revisional program.

The microcomputer may further comprise a vector-address-temporary-storage device that receives the vector address data from the vector-address-storage device, when it is determined by the address comparator that there is the coincidence between the comparison address data and the renewed address of the program counter, and a vector-address data setting system that reads the vector address data from the vector-address-temporary-storage device, and is then set in the program counter, whereby the access to the head address of the revisional program by the controller/calculator is made, resulting in the execution of the interruption-processing in accordance with the revisional program.

The microcomputer may further comprise a return-address-setting system that sets the comparison address data as a return-address data in the program counter when the execution of the interruption-processing in accordance with the revisional program is completed, and an address-coincidence-disabling system that disables the coincidence between the comparison address data and the return-address set in the program counter by the return-address-storage system.

BRIEF DESCRIPTION OF THE DRAWINGS

The object and other objects of the present invention will be better understood from the following description, with reference to the accompanying drawings, in which:

FIG. 4 is a view conceptually showing a comparison-address register (CAR), an address-coincidence-interruption-allowing register (ACIAR) and a vector-address register (VAR) of a first circuit element, holding a comparison address data (CA0) a flag data (FE0) and a vector address data (VA0), respectively;

FIG. 5 is a view conceptually showing a comparison-address register (CAR), an address-coincidence-interruption-allowing register (ACIAR) and a vector-address register (VAR) of a second circuit element, holding a comparison address data (CA1) a flag data (FE1) and a vector address data (VA1), respectively;

FIG. 6 is a view conceptually showing a comparison-address register (CAR), an address-coincidence-interruption-allowing register (ACIAR) and a vector-address register (VAR) of a third circuit element, holding a comparison address data (CA2) a flag data (FE2) and a vector address data (VA2), respectively;

FIG. 7 is a view conceptually showing a comparison-address register (CAR), an address-coincidence-interruption-allowing register (ACIAR) and a vector-address register (VAR) of a fourth circuit element, holding a comparison address data (CA3) a flag data (FE3) and a vector address data (VA3), respectively;

FIG. 8 is a view conceptually showing a comparison-address register (CAR), an address-coincidence-interruption-allowing register (ACIAR) and a vector-address register (VAR) of a fifth circuit element, holding a comparison address data (CA4) a flag data (FE4) and a vector address data (VA4), respectively;

FIG. 9 is a view conceptually showing a comparison-address register (CAR), an address-coincidence-interruption-allowing register (ACIAR) and a vector-address register (VAR) of a sixth circuit element, holding a comparison address data (CA5) a flag data (FE5) and a vector address data (VA5), respectively;

FIG. 10 is a view conceptually showing a comparison-address register (CAR), an address-coincidence-interruption-allowing register (ACIAR) and a vector-address register (VAR) of a seventh circuit element, holding a comparison address data (CA6) a flag data (FE6) and a vector address data (VA6), respectively;

FIG. 11 is a view conceptually showing a comparison-address register (CAR), an address-coincidence-interruption-allowing register (ACIAR) and a vector-address register (VAR) of an eighth circuit element, holding a comparison address data (CA7) a flag data (FE7) and a vector address data (VA7), respectively;

FIG. 13 is a view conceptually showing an address-coincidence-interruption-prohibiting register (ACIPR), an address-coincidence-interruption-clearing register (ACICR) and an address-coincidence-interruption-monitoring register (ACIMR) of the first circuit element, holding flag data (FD0, FC0 and FM0), respectively;

FIG. 14 is a view conceptually showing an address-coincidence-interruption-prohibiting register (ACIPR), an address-coincidence-interruption-clearing register (ACICR) and an address-coincidence-interruption-monitoring register (ACIMR) of the second circuit element, holding flag data (FD1, FC1 and FM1), respectively;

FIG. 15 is a view conceptually showing an address-coincidence-interruption-prohibiting register (ACIPR), an address-coincidence-interruption-clearing register (ACICR) and an address-coincidence-interruption-monitoring register (ACIMR) of the third circuit element, holding flag data (FD2, FC2 and FM2), respectively;

FIG. 16 is a view conceptually showing an address-coincidence-interruption-prohibiting register (ACIPR), an address-coincidence-interruption-clearing register (ACICR) and an address-coincidence-interruption-monitoring register (ACIMR) of the fourth circuit element, holding flag data (FD3, FC3 and FM3), respectively;

FIG. 17 is a view conceptually showing an address-coincidence-interruption-prohibiting register (ACIPR), an address-coincidence-interruption-clearing register (ACICR) and an address-coincidence-interruption-monitoring register (ACIMR) of the fifth circuit element, holding flag data (FD4, FC4 and FM4), respectively;

FIG. 18 is a view conceptually showing an address-coincidence-interruption-prohibiting register (ACIPR), an address-coincidence-interruption-clearing register (ACICR) and an address-coincidence-interruption-monitoring register (ACIMR) of the sixth circuit element, holding flag data (FD5, FC5 and FM5), respectively;

FIG. 19 is a view conceptually showing an address-coincidence-interruption-prohibiting register (ACIPR), an address-coincidence-interruption-clearing register (ACICR) and an address-coincidence-interruption-monitoring register (ACIMR) of the seventh circuit element, holding flag data (FD6, FC6 and FM6), respectively;

FIG. 20 is a side view conceptually showing an address-coincidence-interruption-prohibiting register (ACIPR), an address-coincidence-interruption-clearing register (ACICR) and an address-coincidence-interruption-monitoring register (ACIMR) of the eighth circuit element, holding flag data (FD7, FC7 and FM7), respectively;

DESCRIPTION OF THE PREFERRED EMBODIMENTS

Figure 1:
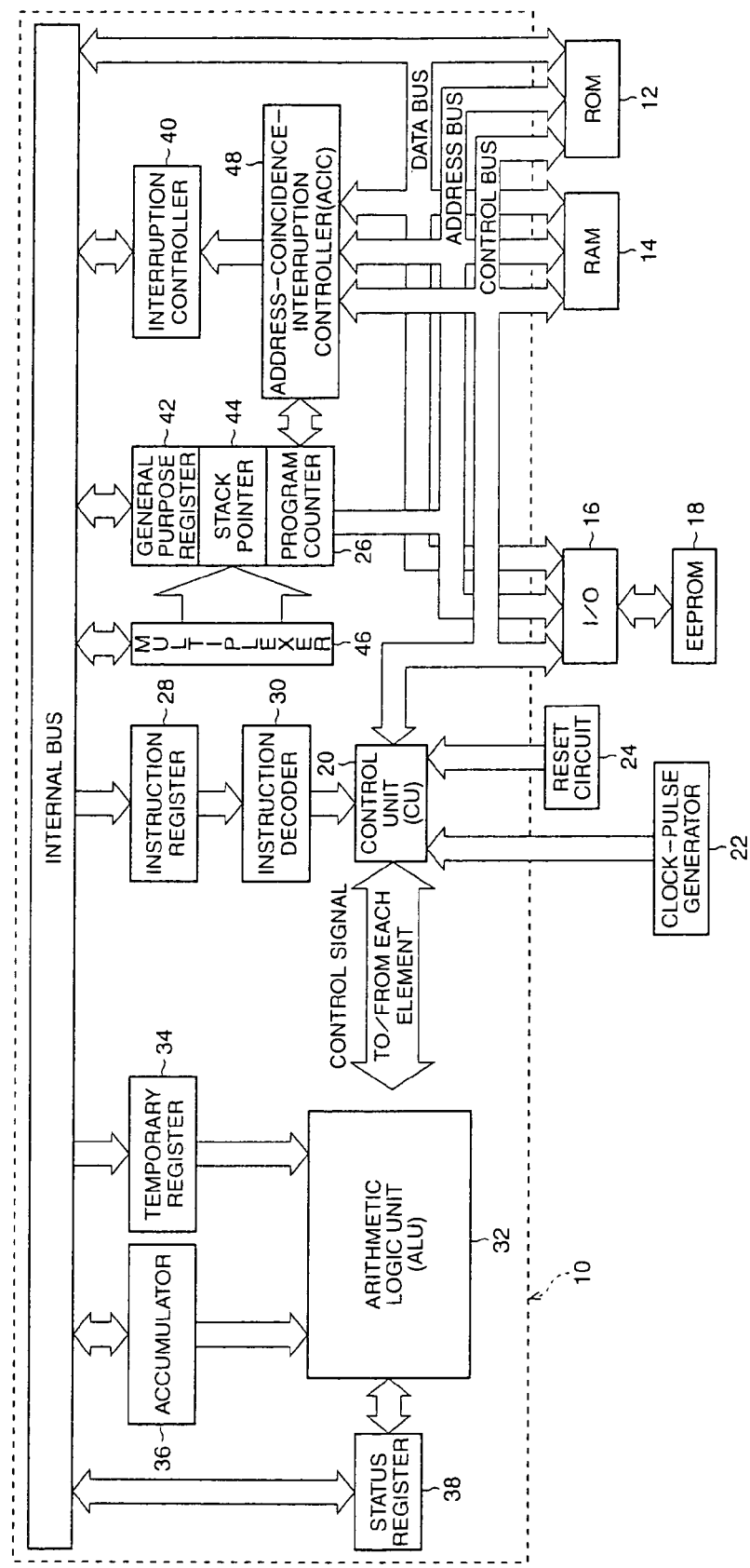
FIG. 1 is a block diagram of a microcomputer arranged according to the present invention.

FIG. 1 shows a block diagram of a microcomputer with a program-revision ability, which is constructed as a single chip microcomputer according to the present invention.

The microcomputer comprises a central processing unit (CPU) 10, a read-only memory (ROM) 12 for storing various programs and constants, a random-access memory (RAM) 14 for storing temporary data, and an input/output interface circuit (I/O) 16. The CPU 10 is connected to some pieces of peripheral equipment (not shown) via the I/O 16, so that various command signals and data signals are exchanged between the cup 10 and the pieces of peripheral equipment. The CPU 10 features an electrically erasable read-only memory (EEPROM) 18, connected to the I/O 16, which stores various data for making revisions in the programs stored in the ROM 12, at least one revisional program and/or at least one additional program, if necessary. Whenever the CPU 10 is powered ON provided that the revisional program and/or the additional program are stored in the EEPROM 18, these programs are read from the EEPROM 18, and then are written in the RAM 14. Each of the programs stored in the RAM 14 is suitably executed during an execution of the ROM-stored programs, as mentioned in detail hereinafter.

As shown in FIG. 1, the CPU 10 includes a control unit (CU) 20, which is provided with a clock-pulse generator 22 and a reset circuit 24. The clock-pulse generator 22 generates a series of basic clock pulses, and the CU 20 produces various kinds of control clock pulses, having different frequencies, based on the series of basic clock pulses. The various kinds of control clock pulses are used to control operations of various elements forming the CPU 10. The reset circuit 24 outputs a reset signal to the CU 20 when the CPU 10 is powered ON, the various elements forming the CPU 10 are initialized.

Also, the CPU 10 includes a program counter 26, an instruction register 28 and an instruction decoder 30, and the CU 20 operates in conjunction with these elements 26, 28 and 30 so as to decode instructions successively read from the ROM-stored programs, and outputs control signals to various elements forming the CPU 10 in accordance with the decoded instructions.

In particular, each of the RAM-stored programs is composed of a series of programed instructions, and each instruction is stored in a given address of the ROM 12. The CU 20 reads an instruction from an address of the ROM 12, which is indicated by the program counter 26. The read instruction is held in the instruction register 28, and is decoded by the instruction decoder 30. Then, the CU 20 outputs a control signal to one of the elements forming the CPU 10 in accordance with the decoded instruction, and a processing is executed in the element concerned of the CPU 10 based on the decoded instruction. As soon as the execution of the processing is completed, the address, indicated by the program counter 26, is incremented by, for example, "1", resulting in renewal of the address, from which an instruction should be read by the CPU 20. In this embodiment, each address of the ROM 12 is composed of 16 bits, and the program counter is formed as a 16-bit register.

Further, the CPU 10 includes an arithmetic logic unit (ALU) 32, a temporary register 34, an accumulator 36 and a status register 38. The ALU 32 executes a binary operation on the basis of a control signal output from the CU 20, in conjunction with the temporary register 34, the accumulator 36 and the status register 38.

Binary data to be processed by the binary operation are suitably retrieved by the ALU 32 from the temporary register 34 and the accumulator 36. For example, constant data read from the ROM 12 or temporary data read from the RAM 14 is held by the temporary register 34, and is retrieved by the ALU 32 from the temporary register 34, whereby the data is processed by the binary operation executed by ALU 32. The processed data or resultant data is input to the accumulator 36 having a calculation-function. Namely, the resultant data, input to the accumulator 36, is processed by the calculation-function thereof, and is held in the accumulator 36. Also, the data is suitably retrieved by the ALU 32 from the accumulator 36, if necessary.

The status register 38 holds various pieces of status-information as flag data representing statuses of the binary operation executed by the ALU 32. Namely, for example, a carry flag, an overflow flag, a zero flag, a sign flag and so on are held by the status register 38 for the representation of the statuses of the binary operation executed by the ALU 32.

Also, the status register 38 holds an interruption-allowing flag, which is initialized to be "0" when the CPU 10 is powered ON. When the interruption-allowing flag is made to be "1", various interruptions are allowed in the CPU 10. When the interruption-allowing flag is "0", all the interruptions are prohibited except for a non-maskable interruption (NMI) and a software interruption.

As shown in FIG. 1, the CPU is further provided with an interruption controller 40, a general purpose register 42 and a stack pointer 44. The interruption controller 40 controls an execution of an interruption-processing or subroutine based on an interruption signal output from either the CU 20 or a piece of peripheral equipment (not shown) connected to the I/O 16. The general purpose register 42 is utilized as a multi-purpose register. Namely, the general purpose register 42 is sectioned into some areas, each of which is defined as, for example, an accumulator, an index register, a stack memory or the like. The stack pointer 44 is formed as a register for indicating an address of the stack memory, defined in the general purpose register 42, from which data should be read. For example, the stack memory holds a return-address which should be accessed after an execution of an interruption-processing or subroutine is completed.

Note, in FIG. 1, reference 46 indicates a multiplexer, which is used to distribute control signals and data to the interruption controller 40, the general purpose register 42 and the stack pointer 44.

Although the aforementioned elements of the CPU 10 are well known in this field, the CPU 10 features a novel element, which is referred to as an address-coincidence-interruption controller (ACIC) 48 constructed according to the present invention.

Figure 2:
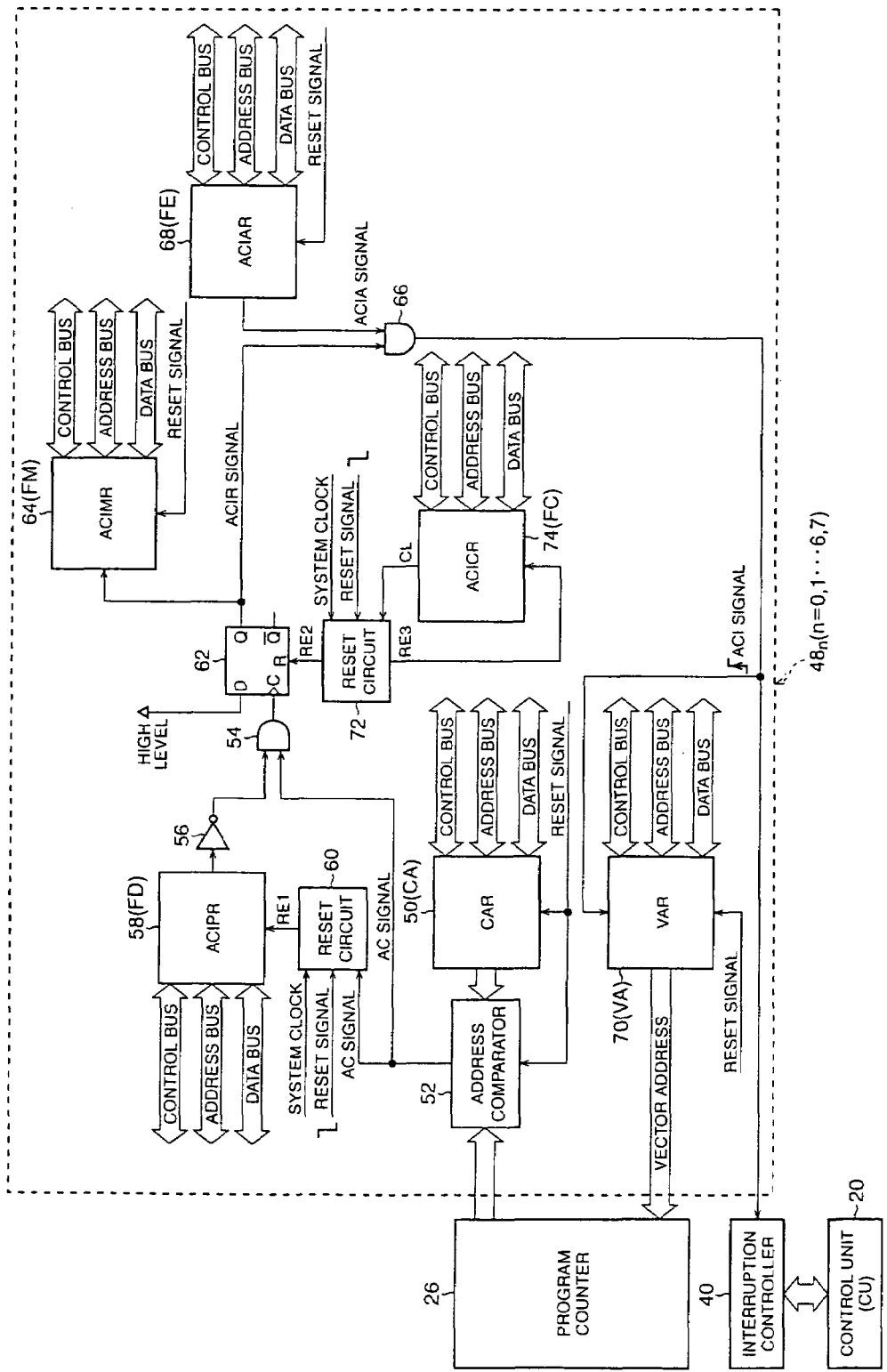
FIG. 2 is a block diagram of a representative one of eight circuit elements included in an address-coincidence-interruption controller (ACIC) forming a part of a first embodiment of the microcomputer according to the present invention.

In a first embodiment of the present invention, the ACIC 48 comprises eight circuit elements, only one of which is representatively shown in FIG. 2, and is generally indicated by reference $48_n$ (n=0, 1, . . . 6 and 7). Of course, the circuit elements $48_n$ are substantially identical to each other. The number of the circuit elements $48_n$ corresponds to a number of optional locations, at each of which the ROM-stored programs should revised. Thus, in this embodiment, it is possible to revise the ROM-stored programs at eight optional locations thereof, as stated in detail hereinafter.

As shown in FIG. 2, each circuit elements $48_n$ includes a comparison-address register (CAR) 50, which is initialized when the CPU 10 is powered ON, and which is suitably connected to the elements of the microcomputer via a control bus, an address bus and a data bus. The CAR 50 is formed as a 16-bit register, the bit-number of which is equal to that of an address of the ROM 12. In each of the eight circuit elements $48_n$, a given address is written in the CAR 50, if necessary.

For example, when it is found that bugs are included in one of the ROM-stored programs, a head address of the program including the bugs is written in the CAR 50. If an additional program should be added at a location of the programs stored in the ROM 12, an address corresponding to that location is written in the CAR 50. Note, the writing of an address in the CAR 50 is explained in detail hereinafter.

As shown in FIG. 2, the CAR 50 is connected to an address comparator 52 via a bus, and the program counter 26 is connected to the address comparator 52 via a bus. As stated above, while the ROM-stored programs are executed, an address is successively renewed in the program counter 26. Whenever the address is renewed, a removed address is compared with the address, held in the CAR 50, by the address comparator 52. Of course, the respective comparisons of the renewed addresses with the address held in the CAR's 50 of the circuit elements $48_n$ are simultaneously performed.

The address comparator 52 has an output terminal, which is connected to one of two input terminals of an AND-gate 54, and an output level of the address comparator 52 to the AND-gate 54 is usually a low level. When the renewed address of the program counter 26 coincides with the address held in the CAR 50, the output level of the address comparator 53 is changed from the low level to a high level. Namely, when there is a coincidence between the renewed address of the program counter 26 the address of the CAR 50, an address-coincidence (AC) signal is output as the high level signal from the address comparator 52. Note, when the CPU 10 is powered ON, the address comparator 52 is initialized such that the low level signal is output from the address comparator 52.

As shown in FIG. 2, the other input terminal of the AND-gate 54 is connected to an output terminal of an inverter 56, and an input terminal of the inverter 56 is then connected to an output terminal of an address-coincidence-interruption-prohibition register (ACIPR) 58. The ACIPR 58 is formed as a 1-bit register, and is suitably connected to the elements of the microcomputer via a control bus, an address bus and a data bus. A setting of "0" is usually given to the ACIPR 58, so that an output level of the ACIPR 58 to the inverter 56 is a low level. However, when a setting of "1" is given to the ACIPR 58, the output level of the ACIPR 58 is changed from the low level to a high level. In short, the 1-bit data of the ACIPR 58 is usually "0", and thus a high level signal is output from the inverter 56. When the 1-bit data of the ACIPR 58 is changed from "0" to "1", a low level signal is output from the inverter 56. Note, the change of the 1-bit data of the ACIPR 58 from "0" to "1" is explained in detail hereinafter.

The ACIPR 58 is associated with a reset circuit 60, which is provided for returning the 1-bit data of the ACIPR 58 from "1" to "0" whenever the 1-bit data of the ACIPR 58 is changed from "0" to "1". Namely, after the 1-bit data of the ACIPR 58 is changed from "0" to "1", when a reset signal RE1 is output as a high level signal from the reset circuit 60 to the ACIPR 58, the 1-bit data of the ACIPR 58 is returned from "1" to "1".

Not only the address-coincidence (AC) signal is input from the address comparator 52 to the reset circuit 60, but also a series of system clock pulses for controlling timings of various operations of the CPU 10 is input to the reset circuit 60. The reset circuit 60 produces the reset signal RE1 based on the AC signal and the system clock pulses as stated in detail hereinafter. Note, the reset circuit 60 is initialized by a reset signal input thereto when the CPU 10 is powered ON.

As shown in FIG. 2, an output terminal of the AND-gate 54 is connected to an input terminal C of a flip-flop 62, and a high level signal is always input to an input terminal D of the flip-flop 62 after the CPU 10 is powered ON. When the address-coincidence (AC) signal is output from the address comparator 52 provided that the high level signal is output from the inverter 56, the AND-gate 54 outputs a high level signal from the output terminal thereof to the input terminal C of the flop-flip 62. At this time, an address-coincidence-interruption-requiring (ACIR) signal is output as a high level signal from the output terminal Q of the flop-flip 62.

The output terminal Q of the flop-flip 62 is connected to an input terminal of an address-coincidence-interruption-monitoring register (ACIMR) 64. Similar to the ACIPR 58, the ACIMR 64 is formed as a 1-bit register, and is suitably connected to the elements of the microcomputer via a control bus, an address bus and a data bus. A 1-bit data of the ACIMR 64 is initialized to be "0" by a reset signal input thereto when the CPU 10 is powered ON. When the address-coincidence-interruption-requiring (ACIR) signal (high level) is output from the output terminal Q of the flop-flip 62, the 1-bit data of the ACIMR 64 is changed from "0" to "1". When the outputting of the ACIR signal comes to a standstill, i.e. when the output level of the output terminal Q of the flop-flip 62 is changed from the high level to the low level, the 1-bit data of the ACIMR 64 is returned from "1" to "0". In short, by reading the 1-bit data from the ACIMR 64, it is possible to determine whether the ACIR signal is output from the output terminal Q of the flop-flip 62.

As shown in FIG. 2, the output terminal Q of the flip-flop 62 is connected to one of two input terminals of an AND-gate 66, and the other input terminal of the AND-gate 66 is connected to an output terminal of an address-coincidence-interruption-allowing register (ACIAR) 68. The ACIAR 68 is also formed as a 1-bit register, and is suitably connected to the elements of the microcomputer via a control bus, an address bus and a data bus. A 1-bit data of the ACIAR 68 is initialized to be "0" by a reset signal input thereto when the CPU 10 is powered ON. When a setting of "1" is given to the ACIAR 68, a high level signal is output from the output terminal of the ACIAR 68, and is then input to the other input terminal of the AND-gate 66. When a setting of "0" is given to the ACIAR 68, a low level signal is output from the output terminal of the ACIAR 68, and is then input to the other input terminal of the AND-gate 66.

Thus, when the setting of "1" is given to the ACIAR 68, and when the address-coincidence-interruption-requiring (ACIR) signal is output from the output terminal Q of the flip-flop 62, the high level signals are input to both the input terminals of the AND-gate 66, whereby an address-coincidence-interruption (ACI) signal is output as a high level signal from an output terminal of the AND-gate 66 to the interruption controller 40. When the ACI signal is input to the interruption controller 40, an interruption-processing is executed in the CPU 10, as explained in detail hereinafter.

As is apparent from FIG. 2, the address-coincidence-interruption-signal (ACI) is also input from the AND-gate 66 to a vector-address register (VAR) 70. The VAR 70 is initialized by a reset signal input thereto when the CPU 10 is powered ON, and is suitably connected to the elements of the microcomputer via a control bus, an address bus and a data bus. Similar to the CAR 50, the VAR 70 is formed as 16-bit register, the bit-number of which is equal to that of an address of the ROM 12.

In each of the eight circuit elements $48_n$, a given vector address is written in the VAR 70, if necessary. A vector address to be written in each VAR 70 corresponds to a head address of a program stored in the RAM 14. Note, when the CPU 10 is powered ON provided that a revisional program and/or an additional program are stored in the EEPROM 18, these programs are read from the EEPROM 18, and are written in RAM 14, as mentioned above.

When the address-coincidence-interruption (ACI) signal is input from the AND-gate 66 to the VAR 70, the vector address is output from the VAR 70 to the program counter 26, and is then written therein. Note, the writing of a vector address in each VAR 70 is explained in detail hereinafter.

After the address-coincidence-interruption-requiring (ACIR) signal is output from the output terminal Q of the flip-flop 62, a reset signal RE2 is output as a high level signal from a reset circuit 72 to a reset terminal R of the flip-flop 62, so that the flip-flop 62 is unlatched, whereby the outputting of the ACIR signal comes to a standstill. Namely, due to the outputting of the reset signal RE2 from the reset circuit 72 to the reset terminal R of the flip-flop 62, the output level of the output terminal Q of the flip-flop 62 is returned from the high level to the low level.

As shown in FIG. 2, the reset circuit 72 is associated with an address-coincidence-interruption-clearing register (ACICR) 74, which produces and outputs a clear signal CL to the reset circuit 72. Further, the aforesaid system clock pulses are input to the reset circuit 72. The reset signal RE2 is produced based on the clear signal CL and the system clock pulses as stated in detail hereinafter. Note, the reset circuit 72 is initialized by a reset signal input thereto when the CPU 10 is powered ON.

The ACICR 74 is also formed as a 1-bit register, and is suitably connected to the elements of the microcomputer via a control bus, an address bus and a data bus. A setting of "0" is usually given to the ACICR 74, but the 1-bit data of the ACICR 74 is changed from "0" to "1" after the address-coincidence-interruption (ACI) signal is input from the AND-gate 66 to the interruption controller 40. At this time, the clear signal CL is output as a high level signal from the ACICR 74 to the reset circuit 72. Note, the setting of 1-bit data to be given to the ACICR 74 is explained in detail hereinafter.

When the flip-flop 62 is unlatched due to the inputting of the reset signal RE2 from the reset circuit 72 to the flip-flop 62, a reset signal RE3 is output from the reset circuit 72 to the ACICR 74, whereby the 1-bit data of the ACICR 74 is returned from "1" to "0", so that the outputting of the clear signal CL from the ACICR 74 to the reset circuit 72 comes to a standstill. Namely, the output level of the ACICR 74 to the rest circuit 72 is returned from the high level to the low level. Note, similar to the reset signal RE2, the reset signal RE3 is produced based on the clear signal CL and the system clock pulses as stated in detail hereinafter.

In the first embodiment, the EEPROM 18 stores eight comparison-address data, eight flag data, and eight vector-address data. Whenever the CPU 10 is powered ON, the eight comparison-address data, eight flag data, and eight vector-address data are read from the EEPROM 18, and are written in the CAR's 50, ACIAR's 68 and VAR's 70 of the eight circuit elements $48_n$, respectively. Further, as already stated, if necessary, the EEPROM 18 stores a revisional program and/or an additional program for making revisions in the ROM-stored programs, and these programs are stored in the RAM 14 whenever the CPU 10 is powered ON.

When the EEPROM 18 is securely installed in the microcomputer, i.e. when the EEPROM 18 cannot be removed from the microcomputer, the aforesaid various data and programs are written in the EEPROM 18, using an EEPROM-writing computer (not shown), which is connected to the microcomputer (FIG. 1). Namely, the writing of the various data and program in the EEPROM 18 is performed by the EEPROM-writing computer through the CPU 10 of the microcomputer. Of course, in this case, an EEPROM-writing program is previously stored in the ROM 12.

On the other hand, when the EEPROM 18 is removably installed in the microcomputer, the EEPROM 18 is once removed from the microcomputer, and is then mounted in an EEPROM-writing computer (not shown) for writing the various data and programs in the EEPROM 18. After the writing of the various data and program in the EEPROM 18 is completed, the EEPROM 18 is removed from the EEPROM-writing computer, and is then returned to the microcomputer. Of course, in this case, the storage of the EEPROM-writing program in the ROM 12 is unnecessary.

Figure 3:
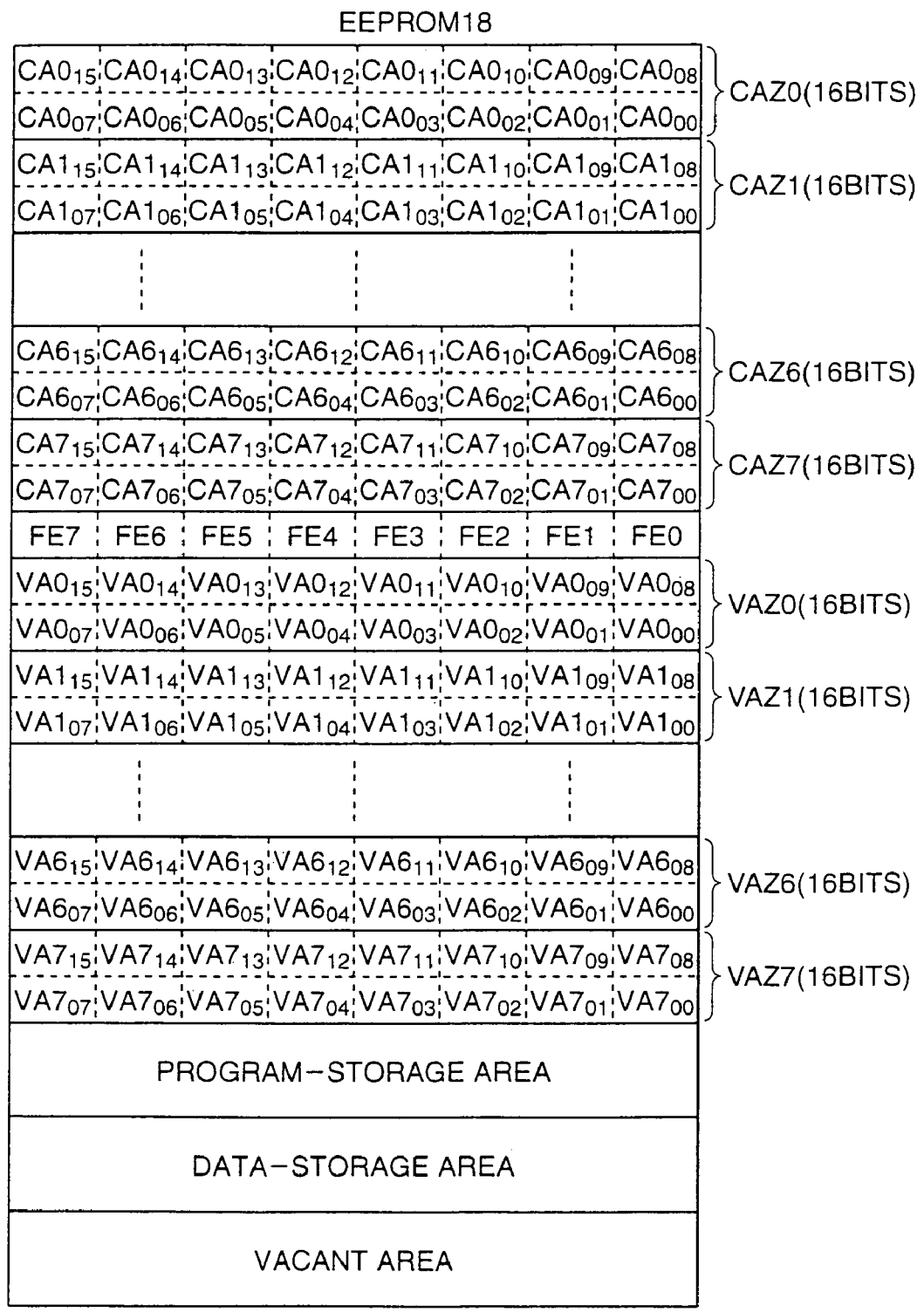
FIG. 3 is a view conceptually showing a memory area of an electrically erasable read-only memory (EEPROM) forming a part of the microcomputer according to the present invention.

Referring to FIG. 3, a memory area of the EEPROM 18 is conceptually illustrated. As shown in this drawing, the EEPROM 18 includes eight comparison-address-storage zones CAZ0, CAZ1, . . . CAZ6 and CAZ7, in which comparison-address data CA0[$CA0_{00}$, $CA0_{01}$, . . . $CA0_{14}$, $CA0_{15}$]; CA1[$CA1_{00}$, $CA1_{01}$, . . . $CA1_{14}$, $CA1_{15}$]; . . . CA6[$CA6_{00}$, $CA6_{01}$, . . . $CA6_{14}$, $CA6_{15}$] and CA7[$CA7_{00}$, $CA7_{01}$, . . . $CA7_{14}$, $CA7_{15}$] are stored, respectively. Also, the EEPROM 18 includes eight vector-address-storage zones VAZ0, VAZ1, . . . VAZ6 and VAZ7, in which vector-address data VA0[$VA0_{00}$, $VA0_{01}$, . . . $VA0_{14}$, $VA0_{15}$]; VA1[$VA1_{00}$, $VA1_{01}$, . . . $VA1_{14}$, $VA1_{15}$]; . . . VA6[$VA6_{00}$, $VA6_{01}$, . . . $VA6_{14}$, $VA6_{15}$] and VA7[$VA7_{00}$, $VA7_{01}$, . . . $VA7_{14}$, $VA7_{15}$] are stored, respectively. Of course, as stated above, each of the comparison-address data CA0, CA1, . . . CA6 and CA7 is formed as a 16-bit data, and each of the vector-address data VA0, VA1, . . . VA6 and VA7 is also formed as a 16-bit data. The EEPROM 18 further includes eight flag-data-storage zones in which flag data FE0, FE1, . . . FE6 and FE7, respectively, each of which is, of course, formed as a 1-bit data. Note, the respective comparison-address data CA0, CA1, . . . CA6 and CA7 correspond to the vector-address data VA0, VA1, . . . VA6 and VA7, and also correspond to the flag data FE0, FE1, . . . FE6 and FE7.

Furthermore, the EEPROM 18 includes a program-storage area and a data-storage area. In the program-storage area, if necessary, a revisional program and/or an additional program is stored for making revisions in the ROM-stored programs. Also, the data-storage area is used to store various data, such as correction data, for an electronic product, such as an electronic camera, a video camera, a printer or the like, in which the microcomputer (FIG. 1) is incorporated.

A first example of revision of the ROM-stored programs is directed to a case where one of the ROM-stored programs includes bugs. In this first example, a revisional or proper program, which should be substituted for the program including the bugs, is prepared and stored in the program-storage area of the EEPROM 18 (FIG. 3), and an address, in which an instruction for leading an execution of the program including the bugs is stored, is written as a comparison address data in one of the comparison-address-storage zones CAZ0, CAZ1, . . . CAZ6 and CAZ7 of the EEPROM 18 (FIG. 3). Also, an address of the RAM 14, at which a first instruction of the proper program should be stored, i.e. a head address of the proper program, is written as a vector address data in a vector-address-storage zone (VAZ0, VAZ1, . . . VAZ6, VAZ7), corresponding to the comparison-address-storage zone (CAZ0, CAZ1, . . . CAZ6, CAZ7) in which the comparison address data is written. Further, a setting of "1" is given to a flag data (FE0, FE1, . . . FE6, FE7), corresponding to the comparison-address-storage zone (CAZ0, CAZ1, . . . CAZ6, CAZ7) in which the comparison address data is written. For example, when the comparison address data is written in the comparison-address-storage zone CAZ0, the vector address data is written in the corresponding vector-address-storage zone VAZ0, and the setting of "1" is given to the corresponding flag data FE0.

Note, the address of the RAM 14, at which the first instruction of the proper program should be stored, is referring to as a head address of the proper program, hereinafter.

A second example of revision of the ROM-stored programs is directed to a case where an additional program is added to the ROM-stored programs at an optional location thereof. In this second example, an additional program, which should be added in the ROM-stored programs, is prepared and stored in the program-storage area of the EEPROM 18, and an address, corresponding to that location of the ROM-stored programs, is written as a comparison address data in one of the comparison-address-storage zones CAZ0, CAZ1, . . . CAZ6 and CAZ7 of the EEPROM 18. Also, an address of the RAM 14, at which a first instruction of the additional program should be stored, is written as a vector address data in a vector-address-storage zone (VAZ0, VAZ1, . . . VAZ6, VAZ7), corresponding to the comparison-address-storage zone (CAZ0, CAZ1, . . . CAZ6, CAZ7) in which the comparison address data is written. Further, a setting of "1" is given to a flag data (FE0, FE1, . . . FE6, FE7), corresponding to the comparison-address-storage zone (CAZ0, CAZ1, . . . CAZ6, CAZ7) in which the comparison address data is written. For example, when the comparison address data is written in the comparison-address-storage zone CAZ1, the vector address data is written in the corresponding vector-address-storage zone VAZ1, and the setting of "1" is given to the corresponding flag data FE1.

Note, the address of the RAM 14, at which the first instruction of the additional program should be stored, is referred to as a head address of the additional program, hereinafter.

A third example of revision of the ROM-stored programs is directed to a case where one of the ROM-stored programs is executed an another optional location thereof. In this third example, a call program for calling the program concerned of the ROM-stored programs is prepared and stored in the program-storage area of the EEPROM 18, and an address, corresponding to that location of the ROM-stored programs, is written as a comparison address data in one of the comparison-address-storage zones CAZ0, CAZ1 , . . . CAZ6 and CAZ7 of the EEPROM 18. Also, an address of the RAM 14, at which a first instruction of the call program should be stored, is written as a vector address data in a vector-address-storage zone (VAZ0, VAZ1, . . . VAZ6, VAZ7), corresponding to the comparison-address-storage zone (CAZ0, CAZ1, . . . CAZ6, CAZ7) in which the comparison address is written. Further, a setting of "1" is given to a flag data (FE0, FE1, . . . FE6, FE7), corresponding to the comparison-address-storage zone (CAZ0, CAZ1, . . . CAZ6, CAZ7) in which the comparison address data is written. For example, when the comparison address data is written in the comparison-address-storage zone CAZ2, the vector address data is written in the corresponding vector-address-storage zone VAZ2, and the setting of "1" is given to the corresponding flag data FE2.

Note, the address of the RAM 14, at which the first instruction of the call program should be stored, is referred to as a head address of the call program, hereinafter.

Each of the flag data FE0, FE1, . . . FE6 and FE7 is utilised to discriminate whether a comparison address stored in a corresponding comparison-address-storage zone (CAZ0, CAZ1, . . . CAZ6, CAZ7) and a corresponding vector-address-storage zone (VAZ0, VAZ1, . . . VAZ6, VAZ7) participate in an actual revision of the ROM-stored programs. Thus, when the aforesaid three examples are incorporated in the ROM-stored programs, the setting of "1" is given only to the three flag data FE0, FE1 and FE2, because the corresponding comparison address data CA0, CA1 and CA2 and the corresponding vector address data VA0, VA1 and VA2 participate in the actual revisions of the ROM-stored programs. In this case, the comparison address data and a setting of "0" is given to the remaining flag data FE3, FE4, . . . FE6 and FE7, because a certain data stored as a comparison address data (CA3, CA4, . . . CA6, CA7) in each comparison-address-storage zone (CAZ3, CAZ4, . . . CAZ6, CAZ7) and a certain stored as a vector address data (VA3, VA4, . . . VA6, VA7) in each vector-address-storage zone (VAZ3, VAZ4, . . . VAZ6, VAZ7) participate in no actual revision of the ROM-stored programs.

As already stated hereinbefore, whenever the CPU 10 is powered ON, the comparison address data CA0, CA1, . . . CA6 and CA7 are read from the comparison-address-storage zones CAZ0, CAZ1, . . . CAZ6 and CAZ7 of the EEPROM 18, and are then written in the CAR's 50 of the circuit elements $48_n$, respectively, whether each comparison address data participates or not in an actual revision of the ROM-stored programs. Similarly, whenever the CPU 10 is powered ON, the vector address data VA0, VA1, . . . VA6 and VA7 are read from the vector-address-storage zones VAZ0, VAZ1, . . . VAZ6 and VAZ7 of the EEPROM 18, and are then written in the VAR's 70 of the circuit elements $48_n$, respectively. Also, whenever the CPU 10 is powered ON, the flag data FE0, FE1, . . . FE6 and FE7 are read from the EEPROM 18, and are then written in the ACIAR's of the circuit elements $48_n$, respectively.

Referring to FIGS. 4 to 11, the CAR 50, ACIAR 68 and VAR 70 of each circuit element ($48_n$), holding the corresponding comparison address data (CA0, CA1, . . . CA6, CA7), flag data (FE0, FE1, . . . FE6 and FE7), and vector address data (VA0, VA1, . . . VA6, VA7), respectively, are conceptually shown. As stated above, when the aforesaid revision examples are incorporated in the ROM-stored programs, the comparison address data CA0, CA1 and CA2 and vector address data CA0, CA1 and VA2 participate in the actual revisions of the ROM-stored programs, and thus the flag data FE0, FE1 and FE2 are "1" (FIGS. 4, 5 and 6). On the other hand, the comparison address data CA3, CA4, . . . CA6 and CA7 and vector address data VA3, VA4, . . . VA6 and VA7 participate in no actual revision of the ROM-stored programs, and thus the flag data FE3, FE4, . . . FE6 and FE7 are "0" (FIGS. 7, 8, 9, 10 and 11). In short due, to the value ("1" or "0") of each flag data (FE0, FE1, . . . FE6, FE7), it is possible to discriminate whether both a comparison address data and a vector address data, corresponding to the flag data concerned, participate or not in an actual revision of the ROM-stored programs.

Also, in the case where the aforesaid revision examples are incorporated in the ROM-stored programs, whenever the CPU 10 is powered ON, the revisional, additional and call programs are read from the program-storage area of the EEPROM 18, and are then written in the RAM 14. Of course, at this time, the various data, such as the correction data, for the electronic product in which the microcomputer (FIG. 1) is incorporated, are read from the data-storage area of the EEPROM 18, and are then written in the ROM 14.

Figure 12:
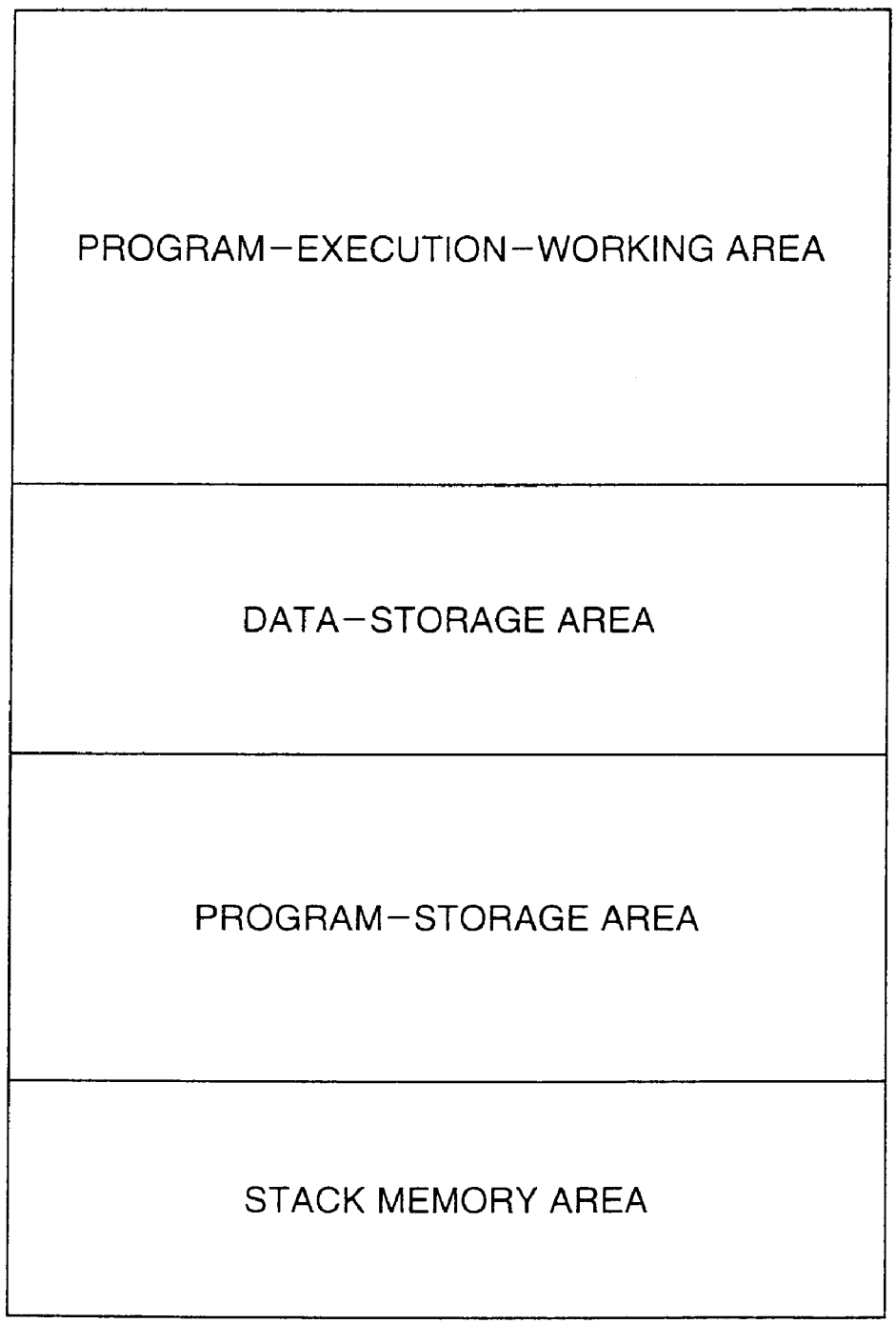
FIG. 12 is a view conceptually showing a memory area of a random-access memory (RAM) forming a part of the microcomputer according to the present invention.

Referring to FIG. 12, a memory area of the RAM 14 is conceptually illustrated. As shown in this drawing the RAM 14 includes a program-execution-working area, a data-storage area, a program-storage area and a stack memory area defined therein. The program-execution-working area is utilized to store, for example, various temporary data which are produced during an execution of the ROM-stored programs. The data-storage area is provided for storing the various data read from the data-storage area of the EEPROM 18. The program-storage area is provided for the revisional, additional and call programs read from the program-storage area of the EEPROM 18. The stack memory area is utilized as a working area for storing, various data to be processed later during the execution of the ROM-stored programs.

Referring to FIGS. 13 to 20, the ACIPR's 58, ACICR's 74 and ACIMR's 64 of the circuit elements $48_n$ are conceptually shown, and each of these registers 58, 74 and 64 is formed as the 1-bit register as mentioned above.

Flag data FD0, FD1, . . . FD6 and FD7 are defined in the ACIPR's 58 of the circuit elements $48_n$, respectively, and are initialized to be "0" when the CPU 10 is powered ON. A setting of "1" is suitably given to each flag data (FD0, FD1, . . . FD6, FD7) according to an aspect of operation of the CPU 10.

Also, flag data FC0, FC1, . . . FC6 and FC7 are defined in the ACICR's 74 of the circuit elements $48_n$, respectively, and are initialized to be "0" when the CPU 10 is powered ON. A setting of "1" is suitably given to each flag data (FC0, FC1, . . . FC6, FC7) according to an aspect of operation of the CPU 10.

Further, flag data FM0, FM1, . . . FM6 and FM7 are defined in the ACIMR's 64 of the circuit elements $48_n$, respectively, and are initialized to be "0" when the CPU 10 is powered ON, A setting of "1" is suitably given to each flag data (FM0, FM1, . . . FM6, FM7) according to an aspect of operation of the CPU 10.

As already stated, during an operation of the CPU 10, an address is successively renewed in the program counter 26. In each of the circuit elements $48_n$, a corresponding address comparator 52 retrieves the successively-renewed address from the program counter 26, and compares the retrieved address with a comparison address data (CA0, CA1, . . . CA6, CA7) held in the corresponding CAR 50. When there is a coincidence between the retrieved address and the comparison address data held in one of the eight CAR's 50, an address-coincidence (AC) signal is output as a high level signal from the address comparator 52.

For example, when the retrieved address coincides with the comparison address data CA0 held in the CAR 50 of the circuit element $48_0$, the address-coincidence (AC) signal is output from the address comparator 52 of the circuit element $48_0$, and is then input to one of the two input terminals of the AND-gate 54 of the circuit element $48_0$. On the other hand, a high level signal is output from the output terminal of the inverter 56 to the other input terminal of the AND-gate 54, due to the initial setting of "0" given to the flag data FD0 defined in the ACIPR 58 of the circuit element $48_0$. In short, when the AC signal is output from the address comparator 52, the output level of the AND-gate 54 is charged from the low level to the high level, and this high level signal is input to the input terminal C of the flip-flop 62.

As stated hereinbefore, the high level signal is always input to the input terminal D of the flip-flop 62. Thus, when the AC signal is output from the address comparator 52, an address-coincidence-interruption requiring (ACIR) signal is output as a high level signal from the output terminal Q of the flip-flop 62 to one of the input terminals of the AND-gate 66.

When the aforesaid revision examples are incorporated in the ROM-stored programs, the comparison address data CA0, CA1 and CA2, held in the CAR's 50 of the circuit elements $48_0$, $48_1$ and $48_2$, respectively, participate in the actual revisions of the ROM-stored programs, and the setting of "1" is given to the corresponding flag data FE0, FE1 and FE2. Thus, in each of the circuit elements $48_0$, $48_1$ and $48_2$, an address-coincidence-interruption-allowing (ACIA) signal is output as a high level signal from the ACIAR 68.

Accordingly, in each of the circuit elements $48_0$, $48_1$ and $48_2$, when an address retrieved from the program counter 26 coincides with a comparison address data (CA0, CA1, CA2) held in the CAR 50, i.e. when an address-coincidence (AC) signal is output from the address comparator 52, an address-coincidence-interruption (ACI) signal is output from the output terminal of the AND-gate 66 to the interruption controller 40 and the VAR 70, due to the ACIA signal being output from the ACIAR 68 to the AND-gate 66 (FE0=1, FE1=1, FE2=1).

Although each of the remaining comparison address data CA3, CA4, CA5, CA6 and CA7 does not participate in an actual revision of the ROM-stored programs, each comparison address data is stored as a certain 16-bit data in a corresponding comparison-address-storage zone (CAZ3, CAZ4, CAZ5, CAZ6, CAZ7) of the EEPROM 18. As stated above, when the CPU 10 is powered ON, the respective comparison address data CA3, CA4, CA5, CA6 and CA7 are read from the comparison-address-storage zones CAZ3, CAZ4, CAZ5, CAZ6 and CAZ7 of the EEPROM 18, and are then written in the CAR's 50 of the circuit elements $48_3$, $48_4$, $48_5$, $48_6$ and $48_7$. Accordingly, in each of the circuit elements $48_3$ to $48_7$, an address retrieved from the program counter 26 may accidentally coincide with a comparison address data (CA3, CA4, CA5, CA6, CA7) held in the CAR 50. Of course, when there is the coincidence between the retrieved address and the comparison address data (CA3, CA4, CA5, CA6, CA7), an address-coincidence (AC) signal is output from the address comparator 52, resulting in an outputting of an address-coincidence-interruption-requiring (ACIR) from the output terminal Q of the flip-flop 62. Nevertheless, an address-coincidence-interruption (ACI) signal cannot be output from the output terminal of the AND-gate 66 to the interruption controller 40 and the VAR 70, because each of the flag data FE3, FE4, FE5, FE6 and FE7 is "0" in that none of the comparison address data CA3, CA4, CA5, CA6 and CA7 participate in an actual revision of the ROM-stored programs.

Figure 21:
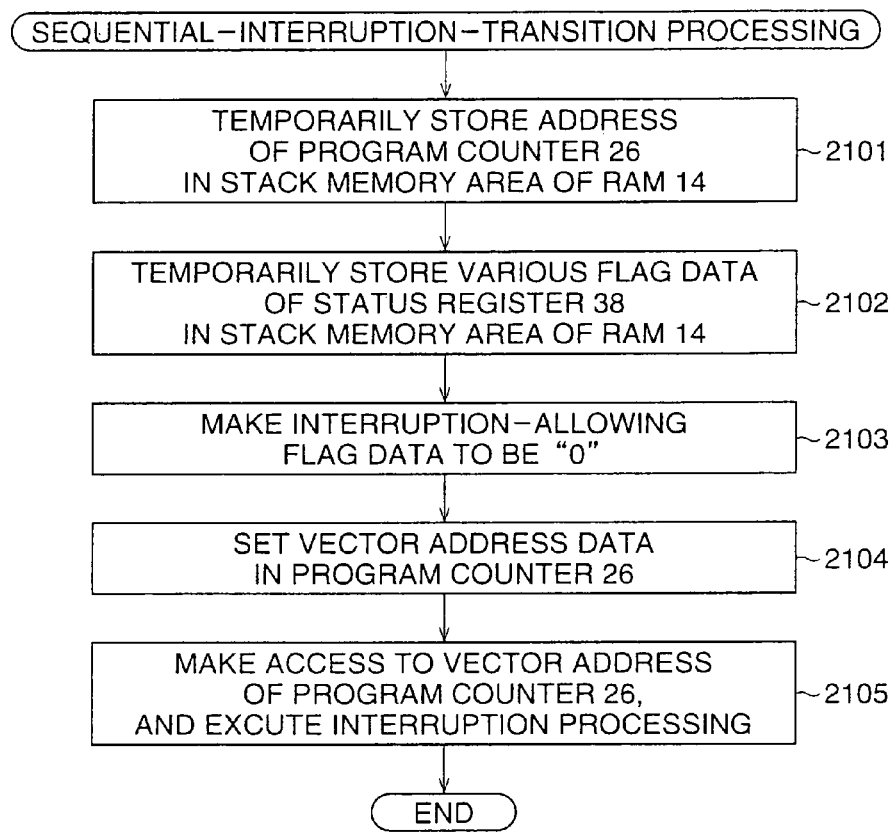
FIG. 21 is a flow chart of a sequential-interruption-transition processing executed by a control unit (CU) forming a part of the microcomputer according to the present invention.

In each of the circuit elements $48_0$, $48_1$ and $48_2$, when the ACI signal is input from the output terminal of the AND-gate 66 to the interruption controller 40, a sequential-interruption-transition processing is executed by the CU 20 of the CPU 10 in accordance with a flowchart as shown in FIG. 21. Note, the execution of the sequential-interruption-transition processing is automatically carried out, regardless of the ROM-stored programs, whenever the ACI signal is input to the interruption controller 40.

At step 2101, the address of the program counter 26, which coincides with the comparison address data (CA0, CA1, CA2), is temporarily stored as a return-address in the stack memory area of the RAM 14 (FIG. 12). Then, at step 2102, the various flag data (such as the carry flag, the overflow flag, the zero flag, the sign flag and so on) of the status register 38 are temporarily stored in the stack memory area of the RAM 14. Successively, at step 2103, the interruption-allowing flag, held in the status register 38, is made to be "0", whereby all the interruptions are prohibited except for a non-maskable interruption (NMI) and a software interruption, as mentioned hereinbefore.

Note, the processing comprising steps 2101, 2102 and 2103 is included in a usual sequential-interruption-transition processing executed in a conventional microcomputer.

At step 2104, the vector address data (VA0, VA1, VA2), held in the VAR 70, is set in the program counter 26 based on the outputting of the ACI signal from the 66 to the VAR 70. Namely, for example, in the circuit element $48_0$, when the ACI signal is output from the AND-gate 66 to the VAR 70, the vector address data VA0 is read from the VAR 70, and is then set in the program counter 70. In short, the address of the program counter 26 is renewed by the vector address data (VA0, VA1, VA2), held in the VAR 70.

In the aforesaid revision examples, as mentioned above, the respective vector address data VA0, VA1 and VA2 correspond to the head addresses of the proper, additional and call programs stored in the program-storage area of the RAM 14. Thus, after the address of the program counter 26 is renewed by the vector address data (VA0, VA1, VA2), the CU 20 makes an access to the head address (vector address) of a corresponding one of the proper, additional and call programs of the RAM 14, and thus the corresponding revisional program is executed as an interruption processing (step 2105).

As soon as the execution of the interruption processing is started (step 2105), a corresponding flag data (FC0, FC1, FC2) held in the ACICR 74 is made to be "1", thereby outputting the clear signal CL from the ACICR 74 to the reset circuit 72. As stated above, when the clear signal CL is input as the high level signal to the reset circuit 72, the reset signal RE2 is produced therein, and is then output to the rest terminal R of the flip-flop 62, so that the flip-flop 62 is unlatched, whereby the outputting of the ACIR signal from the output terminal Q of the flip-flop 62 comes to a standstill. Namely, due to the outputting of the reset signal RE2 to the reset terminal R of the flip-flop 62, the output level of the output terminal Q of the flip-flop 62 is returned from the high level to the low level. Thus, the outputting of the ACI signal from the output terminal of the AND-gate 66 to the interruption controller 40 also comes to a standstill. On the other hand, the reset signal RE3 is also produced in the reset circuit 72, and is then output to the ACICR 74, whereby the corresponding flag data (FC0, FC1, FC2) is reset to be "0", so that the outputting of the clear signal CL from the ACICR 74 to the reset circuit 72 comes to a standstill.

Figure 22:
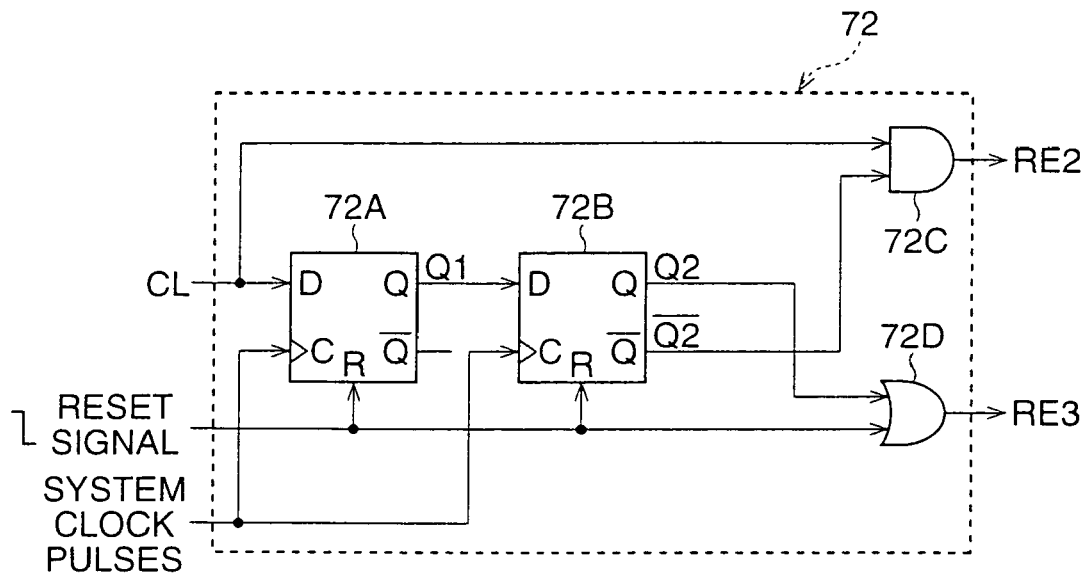
FIG. 22 is a wiring diagram of a reset circuit forming a part of the microcomputer according to the present invention.

FIG. 22 shows a wiring diagram of the reset circuit 72. As shown in this drawing, the reset circuit 72 includes a first flip-flop 72A, a second flip-flop 72B, an AND-gate 72C and an OR-gate 72D. The output terminal of the ACICR 72 is connected to an input terminal D of the first flip-flop 72A and one of two input terminals of the AND-gate 72C, and the other input terminal of the AND-gate 72C is connected to an inverted output terminal Q (with the bar) of the second flip-flop 72B. An output terminal Q of the first flip-flop 72A is connected to an input terminal D of the second flip-flop 72B, and an output terminal of the second flip-flop 72B is connected to one of two input terminals of the OR-gate 72D. An output terminal of the AND-gate 72C is connected to the reset terminal R of the flip-flop 62, and an output of the OR-gate 72D is connected to the input terminal of the ACICR 74.

When the CPU 10 is powered ON, the reset signal is input to both reset terminals R of the first and second flip-flops 72A and 72B, thereby resetting the first and second flip-flops 72A and 72B. Also, the reset signal is input to the other input terminal of the OR-gate 72D, and is output as the reset signal RE3 from the output terminal of the OR-gate 72D, whereby the flag data (FC0, FC1, FC2), held in the ACICR 74, is reset to be "0". Further, as shown in FIG. 22, the series of system clock pulses is continuously input to both input terminals C of the first and second flip-flop 72A and 72B after the CPU 10 is powered ON.

Figure 23:
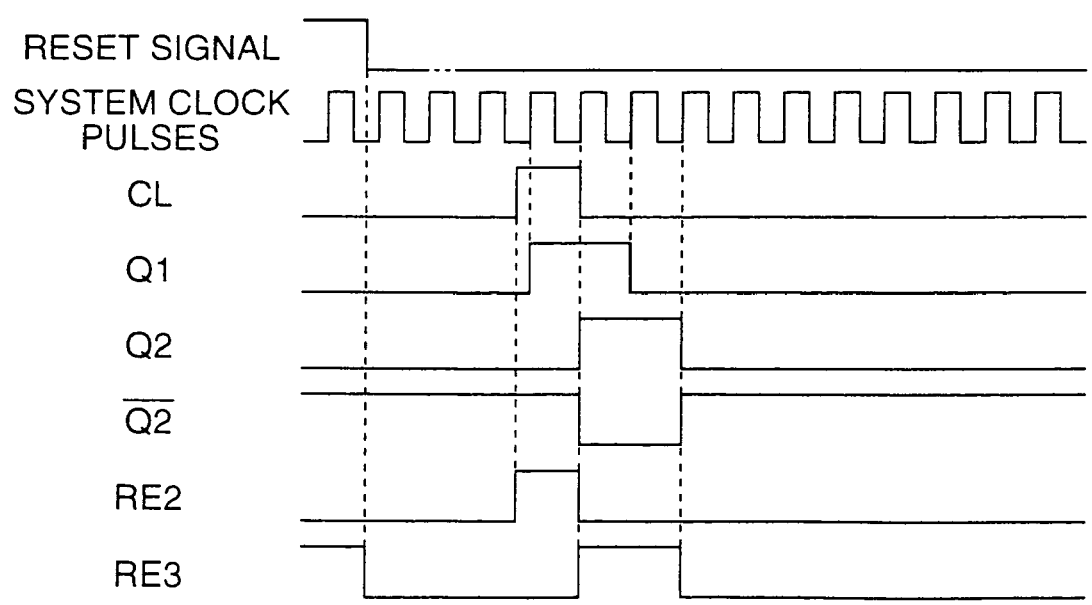
FIG. 23 is a timing chart of the reset circuit shown in FIG. 22.

FIG. 23 shows a timing chart of the reset circuit 72 shown in FIG. 22.

While the flag data (FC0, FC1, FC2), held in the ACICR 74, is "0", i.e. while the output level of the ACICR 74 is the low level, an output level Q1 of the output terminal Q of the first flip-flop 72A is a low level, as shown in the timing chart of FIG. 23. On the other hand, an output level Q2 of the output terminal Q of the second flip-flop 72B is a low level, and an output level Q2 (with the bar) of the inverted output terminal Q (with the bar) of the second flip-flop 72B is a high level. Thus, an output level (RE2) of the AND-gate 72C is a low level, and an output level (RE3) of the OR-gate 72D is a low level.

When the flag data (FC0, FC1, FC2), held in the ACICR 74, is made to "1", i.e. when the clear signal CL is output as the high level signal from the ACICR 74 to the reset circuit 72, the clear signal CL is input to the AND-gate 72C, whereby the reset signal RE2 outputs as the high level signal from the output terminal of the AND-gate 72C, as shown in the timing chart of FIG. 23. Note, at this time, the output level Q2 (with the bar) of the inverted output terminal Q (with the bar) of the second flip-flop 72B is the high level. Thus, as mentioned above, the flip-flop 62 is unlatched, whereby the outputting of the ACIR signal from the output terminal Q of the flip-flop 62 comes to a standstill.

On the other hand, as shown in the timing chart of FIG. 23, when the clear signal CL is input to the input terminal D of the first flip-flop 72A, the output level Q1 of the output terminal Q of the first flip-flop 72A is changed from the low level to a high level in synchronization with a rise of one of the system clock pulses, as shown in the timing chart of FIG. 23. When this high level signal (Q1) is input to the input terminal D of the second flip-flop 72B, the output level Q2 of the output terminal Q of the second flip-flop 72B is changed from the low level to a high level, and the output level Q (with the bar) of the inverted output terminal Q (with the bar) of the second flip-flop 72B is changed from the high level to a low level, with both the changes simultaneously occurring in synchronization with a rise of one of the system clock pulses, as shown in the timing chart of FIG. 23.

Thus, the output level of the AND-gate 72C is returned from the high level to the low level, due to the change of the output level Q (with the bar) of the inverted output terminal Q (with the bar) of the second flip-flop 72B from the high level to the low level. Namely, the outputting of the reset signal RE2 from the AND-gate 72C comes to a standstill. On the other hand, the output level of the OR-gate 72D is changed from the low level to the high level, due to the change of the output level Q2 of the output terminal Q of the second flip-flop 72B from the low level to the high level. Namely, the reset signal RE3 is output as the high level signal to the ACIC register 74, as shown in the timing chart of FIG. 23.

When the reset signal RE3 is input to the ACICR 74, the flag data (FC0, FC1, FC2) is returned from "1" to "0", whereby the output level of the ACICR 74 to the reset circuit 72 is returned from the high level to the low level. Namely, the outputting of the clear signal CL from the ACICR 74 to the reset circuit 72 comes to a standstill. As is apparent from the timing chart of FIG. 23, after the outputting of the clear signal CL from the ACICR 74 to the reset circuit 72 comes to a standstill, the first flip-flop 72A is unlatched in synchronization with a rise of one of the system clock pulses, whereby the output level Q1 of the output terminal Q of the first flip-flop 72A is returned from the high level to the low level, as shown in the timing chart of FIG. 23.

Then, after the return of the output level Q1 of the output terminal Q of the first flip-flop 72A from the high level to the low level, the second flip-flop 72B is unlatched in synchronization with a rise of one of the system clock pulses, whereby the output level Q1 of the output terminal Q of the second flip-flop 72B is returned from the high level to the low level, and whereby the output level Q2 (with the bar) of the inverted output terminal Q (with the bar) of the second flip-flop 72A is returned from the low level to the high level, as shown in the timing chart of FIG. 23.

In short, as explained with reference to the aforesaid revision examples, as soon as the interruption processing is executed for the revision of the ROM-stored programs, due to the outputting of the ACI signal from the AND-gate 66 to the interruption controller 40, the setting of "1" is given to the flag data (FC0, FC1, FC2) held in the ACICR 74, whereby the outputting of the ACI signal from the AND-gate 66 to the interruption controller 40 comes to a standstill. Then, as soon as the outputting of the ACI signal from the AND-gate 66 to the interruption controller 40 comes to a standstill, the flag data (FC0, FC1, FC2), held in the ACICR 74, is returned from "1" to "0".

Figure 24:
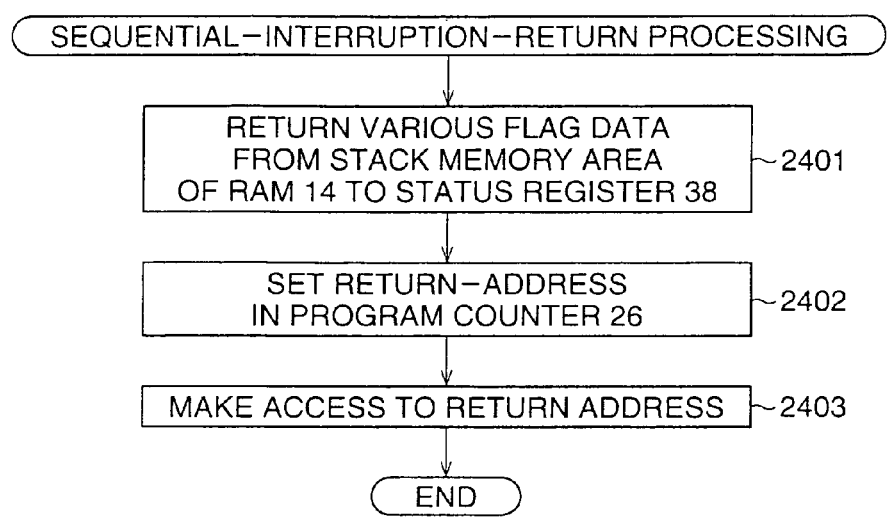
FIG. 24 is a flow chart of a sequential-interruption-return processing executed by the control unit (CU) of the microcomputer according to the present invention.

After a completion of the execution of the interruption processing based on one of the aforesaid second and third revision examples (except for the first revision example), a sequential-interruption-return processing is executed by the CU 20 of the CPU 10 in accordance with a flowchart as shown in FIG. 24.

Note, as stated in detail hereinafter, in the execution of the interruption processing, a setting of "1" is given to the flag data (FD1, FD2) held in the ACIPR 58, whereby the output level of the ACIPR 58 to the inverter 56 is changed from the low level to the high level, resulting in a change of the output level of the inverter 56 from the high level to the low level.

At step 2401, the various flag data, temporarily stored in the stack memory area of the RAM 14, are returned to the status register 38, and the interruption-allowing flag, held in the status register 38, is made to "1", whereby all the interruptions are again allowed.

At step 2402, the return-address, temporarily stored in the stack memory area of the RAM 14, is returned to and set in the program counter 26. Then, at step 2403, the CU 20 makes an access to the return-address of the ROM 12, indicated by the program counter 26, whereby a processing is executed based on the ROM-stored programs.

In the sequential-interruption-return processing of FIG. 24, when the return-address is set in the program counter 26 (step 2402), the AC signal is again output from the address comparator 52, because there is the coincidence between the return-address and the comparison address data (CA1, CA2) held in the CAR 50. Nevertheless, the outputting of the AC signal from the address comparator 52 is ignored, because the output level of the inverter 56 to the AND-gate 54 is the low level due to the flag data (FD1, FD2) being "1". In short, the ACIR signal cannot be output from the output terminal Q of the flip-flop 62.

On the other hand, when the return-address is set in the program counter 26 (step 2402), the AC signal, output from the address comparator 52, is input to the reset circuit 60. Then, when the return-address of the program counter 26 is renewed according to an execution of the ROM-stored programs, the outputting of the AC signal from the address comparator 52 comes to a standstill, because there is no coincidence between the renewed address and the comparison address data (CA1, CA2) held in the CAR 50. When the outputting of the AC signal from the address comparator 52 comes to a standstill, i.e. when the output level of the address comparator 52 to the reset circuit 60 is returned from the high level to the low level, the reset signal RE1 is produced in the reset circuit 60, and is output to the ACIPR 58, whereby the flag data (FD1, FD2) held in the ACIPR 58 is returned from "1" to "0", resulting in a return of the output level of the ACIPR 58 to the inverter 56 the high level to the low level.

Figure 25:
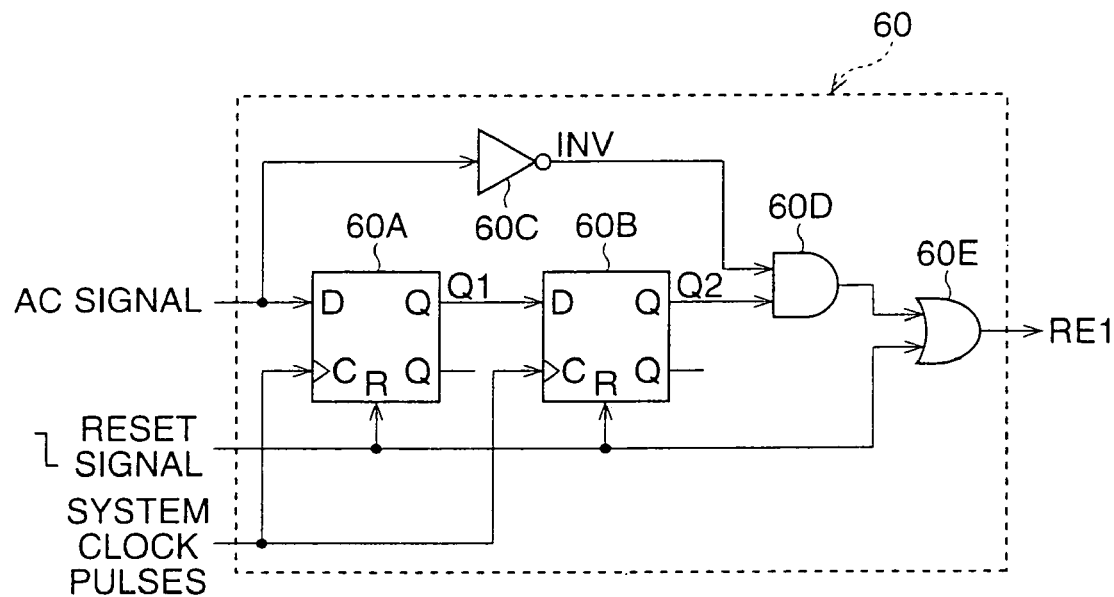
FIG. 25 is a wiring diagram of another reset circuit forming a part of the microcomputer according to the present invention.

FIG. 25 shows a wiring diagram of the reset circuit 60. As shown in this drawing, the reset circuit 60 includes a first flip-flop 60A, a second flip-flop 60B, an inverter 60C, an AND-gate 60D and an OR-gate 60E. The output terminal of the address comparator 52 is connected to an input terminal D of the first flip-flop 60A and an input terminal of the inverter 60C, and an output terminal Q of the first flip-flop 60A is connected to an input terminal D of the second flip-flop 60B. An output terminal of the inverter 60C is connected to one of two input terminals of the AND-gate 60D, and the other input terminal of the AND-gate 60D is connected to an output terminal Q of the second flip-flop 60B. An output terminal of the AND-gate 60D is connected to one of two input terminals of the OR-gate 60E, and an output terminal of the OR-gate 60E is connected to the input terminal of the ACIPR 58.

When the CPU 10 is powered ON, the reset signal is input to both reset terminals R of the first and second flip-flops 60A and 60B, thereby resetting the first and second flip-flop 60A and 60B. Also, the reset signal is input to the other input terminal of the OR-gate 60E, and is then output as the reset signal RE1 the output terminal of the OR-gate 60E, whereby the flag data (FD1, FD2), held in the ACIPR 58, is reset to be "0". Further, as shown in FIG. 25, the series of system clock pulses is continuously input to both input terminals C of the first and second flip-flop 60A and 60B after the CPU 10 is powered ON.

Figure 26:
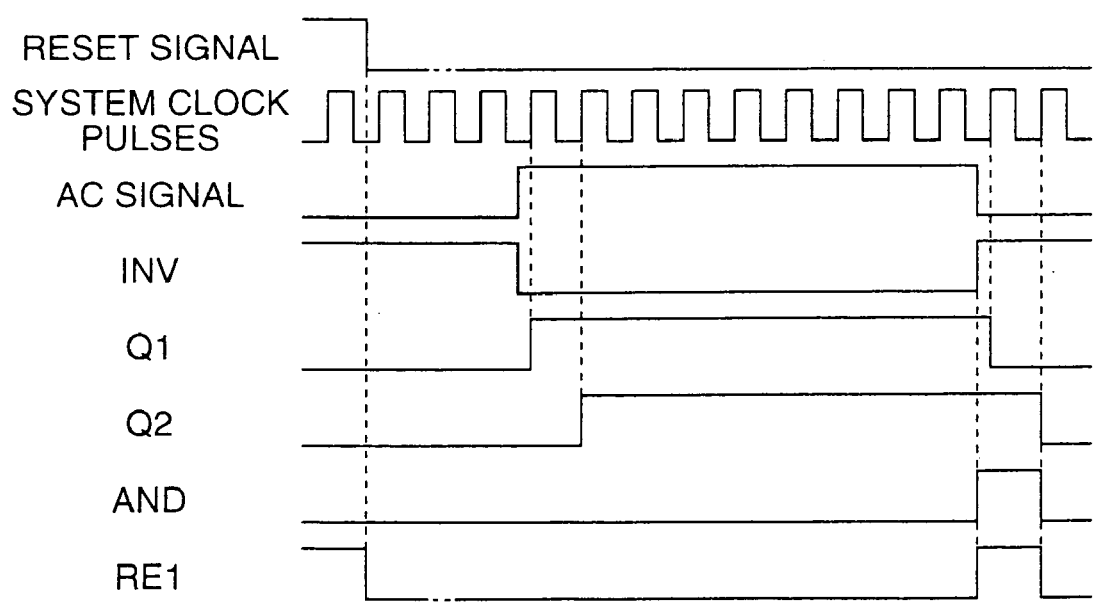
FIG. 26 is a timing chart of the reset circuit shown in FIG. 25.

FIG. 26 shows a timing chart of the reset circuit 60 shown in FIG. 25.

As already mentioned hereinbefore, when the return-address is set in the program counter 26 during the execution of the sequential-interruption-return processing of FIG. 24 (step 2402), the AC signal is again output from the address comparator 52, due to there being the coincidence between the return-address and the comparison address data (CA1, CA2) held in the CAR 50. Namely, the output level of the address comparator 52 is changed from the low level to the high level, as shown in the timing chart of FIG. 26.

Note, although the AC signal is output from the address comparator 52, the ACIR signal cannot be output from the output terminal Q of the flip-flop 62, because the setting of "1" given to the flag data (FD1, FD2) held in the ACIPR 58, as stated above.

When the AC signal, output from the address comparator 52, is input to the inverter 60C, an output level INV of the inverter 60C is changed from a high level to a low level, as shown in the timing chart of FIG. 26. Also, after the AC signal is input to the input terminal D of the first flip-flop 60A, an output level of the output terminal Q of the first flip-flop 60A is changed from a low level to a high level in synchronization with a rise of one of the system clock pulses. After this high level signal (Q1) is input to the input terminal D of the second flip-flop 60B, an output level Q2 of the output terminal Q of the second flip-flop 60B is changed from a low level to a high level in synchronization with a rise of one of the system clock pulses, as shown in the timing chart of FIG. 26. At this time, an output level of the AND-gate 60D is still a low level, due to the existence of the inverter 60C.

When the return-address of the program counter 26 is renewed according to the execution of the ROM-stored programs, the outputting of the AC signal from the address comparator 52 comes to a standstill, because there is no coincidence between the renewed address and the comparison address data (CA1, CA2) held in the CAR 50. Namely, the output level of the address comparator 52 is returned from the high level to the low level, as shown in the timing chart of FIG. 26. Thus, the output level INV of the inverter 60C is returned from the low level to the high level, whereby the output level of the AND-gate 60D is changed from the low level to a high level, resulting in an outputting of the reset signal RE1 from the output terminal of the OR-gate 60E to the ACIPR 58. As stated above, when the reset signal RE1 is input to the ACIPR 58, the flag data (FD1, FD2) held therein is reset to be "0".

On the other hand, after the outputting of the AC signal from the address comparator 52 comes to a standstill, i.e. after the output level of the address comparator 52 to the input terminal D of the first flip-flop 60A is returned from the high level to the low level, the first flip-flop 60A is unlatched in synchronization with a rise of one of the system clock pulses, resulting in a return of the output level Q1 of the output terminal Q of the first flip-flop 60A from the high level to the low level, as shown in the timing chart of FIG. 26. After the low level signal (Q1) is input to the output terminal Q of the second flip-flop 60B, this second flip-flop 60B is unlatched in synchronization with a rise of one of the system clock pulses, resulting in a return of the output level Q2 of the output terminal Q of the second flip-flop 60B from the high level to the low level, as shown in the timing chart of FIG. 26. Thus, the output level of the AND-gate 60D is returned from the high level to the low level, whereby the outputting of the reset signal RE1 from the OR-gate 60E comes to a standstill. Namely, the output level of the OR-gate 60E is returned from the high level to the low level.

In short, in the aforesaid second and third revision examples, before the completion of the execution of the interruption processing, the setting of "1" is given to the flag data (FD1, FD2) held in the ACIPR 58, whereby the outputting of the ACIR signal from the output terminal Q of the flip-flop 62, and therefore, the outputting of the ACI signal from the AND-gate 66 is prohibited, notwithstanding the outputting of the AC signal from the address comparator 52 due to there being the coincidence between the return-address and the comparison address data (CA1, CA2) held in the CAR 50. Then, when the return-address of the program counter 26 is renewed, the flag data (FD1, FD2) is reset to be "0" due to the reset circuit 60 arranged as shown in FIG. 25.

In the aforesaid first revision example directed to the case where one of the ROM-stored programs includes bugs, even if the execution of the interruption processing is completed, the flag data FD0 held in the ACIPR 58 cannot be set to be "1", as stated hereinafter, and thus, the sequential-interruption-return processing (FIG. 24) cannot be executed, because other wise the program including the bugs is executed due to the return-address being returned from the stack memory area of the RAM 14 to the program counter 26. Accordingly, in the aforesaid first revision example, after the execution of the interruption processing is completed, the CU 20 must make an access to a suitable address, before the execution of the program including the bugs can be prevented. Namely, in the aforesaid first revision example, after the execution of the interruption processing is completed, such a suitable address is set in the program counter 26.

In the aforesaid first revision example, the various flag data, temporarily stored in the stack memory area of the RAM 14, are utilised during the execution of the interruption processing, if necessary, and are otherwise scrapped. Of course, the return-address, temporarily stored in the stack memory array of the RAM 14, is scrapped.

Note, in the aforesaid second and third revision examples, after the execution of the interruption processing is completed, the CU 20 does not necessarily make an access to the return-address. Namely, the CU 20 may make an access to a suitable address after the completion of the execution of the interruption processing, similar to the case of the aforesaid first revision example.

Figure 27:
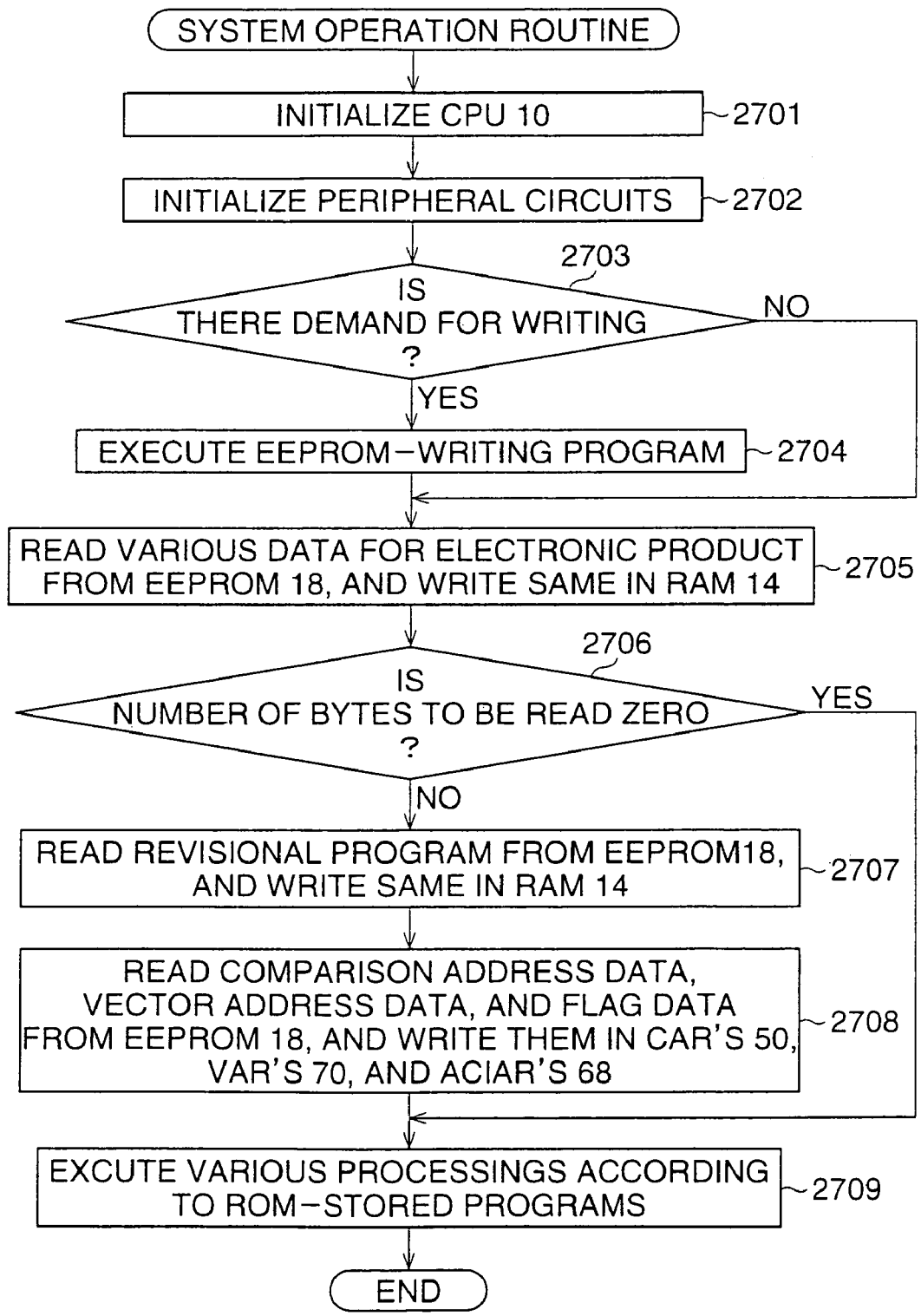
FIG. 27 is a flow chart of a system operation routine for an electronic product, such as a printer, a video camera, a digital still camera, an electronic watch and so on, in which the microcomputer according to the present invention is incorporated.

FIG. 27 shows, by way of example, a system operation routine for an electronic product, such as a printer, a video camera, a digital still camera, an electronic watch and so on, in which the aforementioned microcomputer is incorporated. Note, an execution of the system operation routine is started by electrically powering the electronic product ON.

At step 2701, the CPU 10 is initialized, and then, at step 2702, peripheral circuits, included in the electronic product, are initialized.

At step 2703, it is determined whether there is a demand for writing revisional programs and various data in the EEPROM 18. As already stated hereinbefore, when the EEPROM 18 cannot be removed from the microcomputer, the microcomputer (FIG. 1) is connected to the EEPROM-writing computer (not shown) for writing the revisional programs and various data in the EEPROM 18. In this case, a signal for demanding to write the revisional programs and various data in the EEPROM 18 is output from the EEPROM-writing computer to the CPU 10 of the microcomputer. Thus, it is possible to determine whether there is the demand for writing the revisional programs and various data in the EEPROM 18.

At step 2703, if it is confirmed that there is the demand for writing the revisional programs and various data in the EEPROM 18, the control proceeds to step 2704, in which the EEPROM-writing program, previously stored in the ROM 12, is executed, whereby the writing of the revisional programs and various data in the EEPROM 18 is performed under control of the EEPROM-writing computer. Of course, when the aforesaid three revision examples are incorporated in the ROM-stored programs, the proper, additional and call programs, the comparison address data CA0, CA1 and CA2, the vector address data VA0, VA1 and VA2, and the flag data FE0, FE1 and FE2 are written in the EEPROM 18 at step 2704. Also, if necessary, a writing of various data, such as correction data, for the electronic product in the EEPROM 18 is performed at step 2704.

When the writing of the revisional programs and various data in the EEPROM 18 is completed, i.e. when the EEPROM-writing computer is disconnected from the microcomputer, the control proceeds to step 2705. On the other hand, at step 2704, when there is no demand for writing revisional programs and various data in the EEPROM 18, i.e. when the microcomputer is not connected to the EEPROM-writing computer, the control skips over step 2704, and proceeds to step 2705.

In either case, at step 2705, the various data, such as correction data, for the electronic product, are read from the data-storage area of the EEPROM 18 (FIG. 3), and are then written in the data-storage area of the RAM 14. (FIG. 12).

Note, when the EEPROM 18 is removably installed in the microcomputer, the writing of the revisional programs and various data in the EEPROM 18 is directly performed, using the EEPROM-writing computer on which the removed EEPROM 18 is mounted, as mentioned hereinbefore. Thus, in this case, steps 2703 and 2704 are omitted from the system operation routine of FIG. 27.

At step 2706, it is determined whether a number of bytes to be read from the program-storage area of the EEPROM 18 (FIG. 3) is zero. If at least one revisional program is stored in the program-storage area of the EEPROM 18, there are a number of bytes corresponding to the stored revisional program. However, if no revisional program is stored in the program-storage area of the EEPROM 18, there is zero number of bytes to be read from the program-storage area of the EEPROM 18.

When the number of bytes to be read from the program-storage area of the EEPROM 18 is not zero, i.e. when at least one revisional program is stored in the program-storage area of the EEPROM 18, the control proceeds to step 2707, in which the revisional program is read from the program-storage area of the EEPROM 18, and is then written in the program-storage area of the RAM 14.

At step 2708, the respective comparison address data CA0, CA1, ... CA6 and CA7 are read from the comparison-address-storage zones CAZ0, CAZ1, ... CAZ6 and CAZ7 of the EEPROM 18, and are then written in the CAR's 50 of the circuit elements $48_n$; the respective vector address data VA0, VA1, ... VA6 and VA7 are read from the vector-address-storage zones VAZ0, VAZ1, ... VAZ6 and VAZ7 of the EEPROM 18, and are then written in the VAR's 70 of the circuit elements $48_n$; and the respective flag data FE0, FE1, ... FE6 and FE7 are read from the eight flag-data-storage zones of the EEPROM 18, and are then written in the AIAR's 68 of the circuit elements $48_n$. Thereafter, at step 2709, various processing-routines are executed in accordance with the ROM-stored programs.

Of course, at step 2706, if the number of bytes to be read from the program-storage area of the EEPROM 18 is zero, i.e. if no revisional program is stored in the program-storage area of the EEPROM 18, the control skips steps 2707 and 2708, and proceeds to step 2709.

Figure 28:
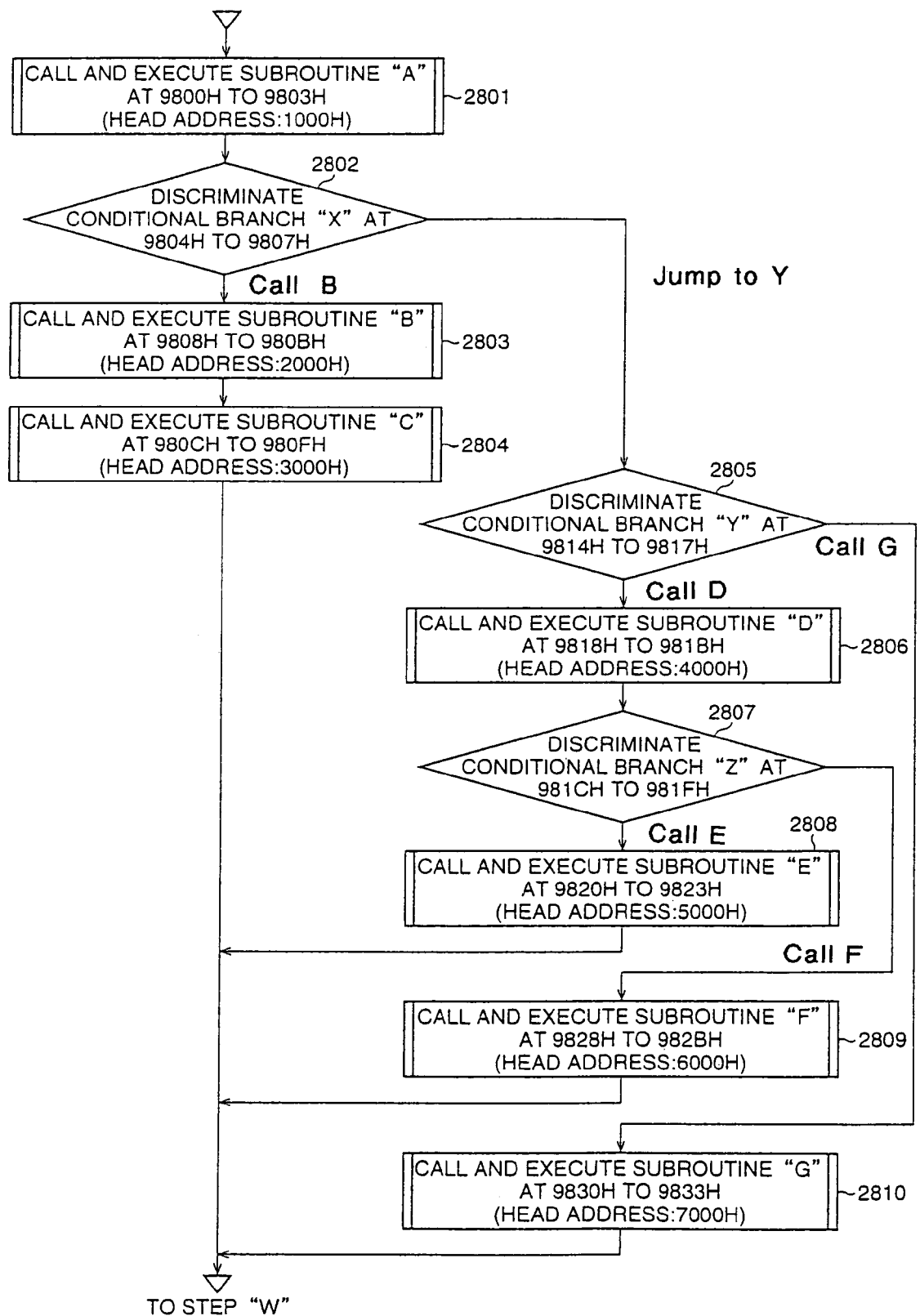
FIG. 28 is a part of a processing-routine to be executed in step 2709 of the system operation routine shown in FIG. 27.

Referring to FIG. 28, a part of a processing-routine to be executed in step 2709 of the system operation routine (FIG. 27) is shown by way of example. As is apparent from FIG. 28, the processing-routine includes steps 2801 to 2810, and an instruction in the ROM 12 at a given address thereof, is executed at each step (2801, 2802, ... 2809, 2810). In other words, the processing-routine is programmed and stored in the ROM 12 at given addresses thereof.

Note, in the microcomputer (FIG. 1), an instruction to execute in each step (2801, 2802, ... 2809, 2810) is composed of 4 bytes, and thus is stored in a 4-byte address (ROM 12).

At step 2801, a subroutine A is called and executed. An instruction for calling and executing the subroutine A is stored in a 4-byte address consisting of, for example, four consecutive addresses 9800H to 9803H (ROM 12), each of which is composed of one byte. Note, a character "H", appended to each four-digit address number, represents that the address number is based on the hexadecimal notation. Also, note, a head address number of the subroutine A is represented as 1000H by way of example.

At step 2802, an instruction for discriminating a conditional branch X is executed. This instruction is stored in a 4-byte address consisting of four consecutive addresses 9804H to 9807H following the address 9803H.

On assumption that the control proceeds from step 2802 to step 2803 as a result of the discrimination of the conditional branch X, a subroutine B is called and executed (step 2803). An instruction for calling and executing the subroutine B is stored in a 4-byte address consisting of four consecutive addresses 9808H to 980BH following the address 9807H. Note, a head address number of the subroutine B is represented as 2000H by way of example.

At step 2804, a subroutine C is called and executed. An instruction for calling and executing the subroutine C is stored in a 4-byte address consisting of four consecutive addresses 980CH to 980FH following the address 980BH. Note, a head address number of the subroutine C is represented as 3000H by way of example.

At step 2804, after the execution of the subroutine C is completed, the control jumps to an optional step "W". Of course, an instruction for making the control jump to the step "W" is stored in a 4-byte address consisting of four consecutive addresses 9810H and 9813H following the address 980FH.

On assumption that the control jumps from step 2802 to step 2805 as a result of the discrimination of the conditional branch X, an instruction for discriminating a conditional branch Y is executed (step 2805). This instruction is stored in a 4-byte address consisting of four consecutive addresses 9814H to 9817H following the address 9813H.

On assumption that the control proceeds from step 2805 to step 2806 as a result of the discrimination of the conditional branch Y, a subroutine D is called and executed (step 2806). An instruction for calling and executing the subroutine D is stored in a 4-byte address consisting of four consecutive addresses 9818H to 981BH following the address 9817H. Note, a head address number of the subroutine D is represented as 4000H by way of example.

At step 2807, an instruction for discriminating a conditional branch Z is executed. This instruction is stored in a 4-byte address consisting of four consecutive addresses 981CH to 981FH following the address 981BH.

On assumption that the control proceeds from step 2807 to step 2808 as a result of the discrimination of the conditional branch Z, a subroutine E is called and executed (step 2808). An instruction for calling and executing the subroutine E is stored in a 4-byte address consisting of four consecutive addresses 9820H to 9823H following the address 981FH. Note, a head address number of the subroutine E is represented as 5000H by way of example.

At step 2808, after the execution of the subroutine E is completed, the control jumps to the optional step "W". Of course, an instruction for making the control jump to the step "W" is stored in a 4-byte address consisting of four consecutive addresses 9824H to 9827H following the address 9823H.

On assumption that the control jumps from step 2807 to step 2809 as a result of the discrimination of the conditional branch Z, a subroutine F is called and executed (step 2809). An instruction for calling and executing the subroutine F is stored in a 4-byte address consisting of four consecutive addresses 9828H to 982BH following the address 9827H. Note, a head address number of the subroutine F is represented as 6000H by way of example.

At step 2809, after the execution of the subroutine F is completed, the control jumps to the optional step "W". Of course, an instruction for making the control jump to the step "W" is stored in a 4-byte address consisting of four consecutive addresses 982CH to 982FH following the address 982BH.

On assumption that the control jumps from step 2805 to step 2810 as a result of the discrimination of the conditional branch Y, a subroutine G is called and executed (step 2810). An instruction for calling and executing the subroutine G is stored in a 4-byte address consisting of four consecutive addresses 9830H to 9833H following address 982FH. Note, a head address number of the subroutine G is represented as 7000H by way of example.

At step 2810, after the execution of the subroutine G is completed, the control jumps to the optional step "W". Of course, an instruction for making the control jump to the step "W" is stored in a 4-byte address consisting of four consecutive addresses 9834H to 9837H following the address 9833H.

Figure 29:
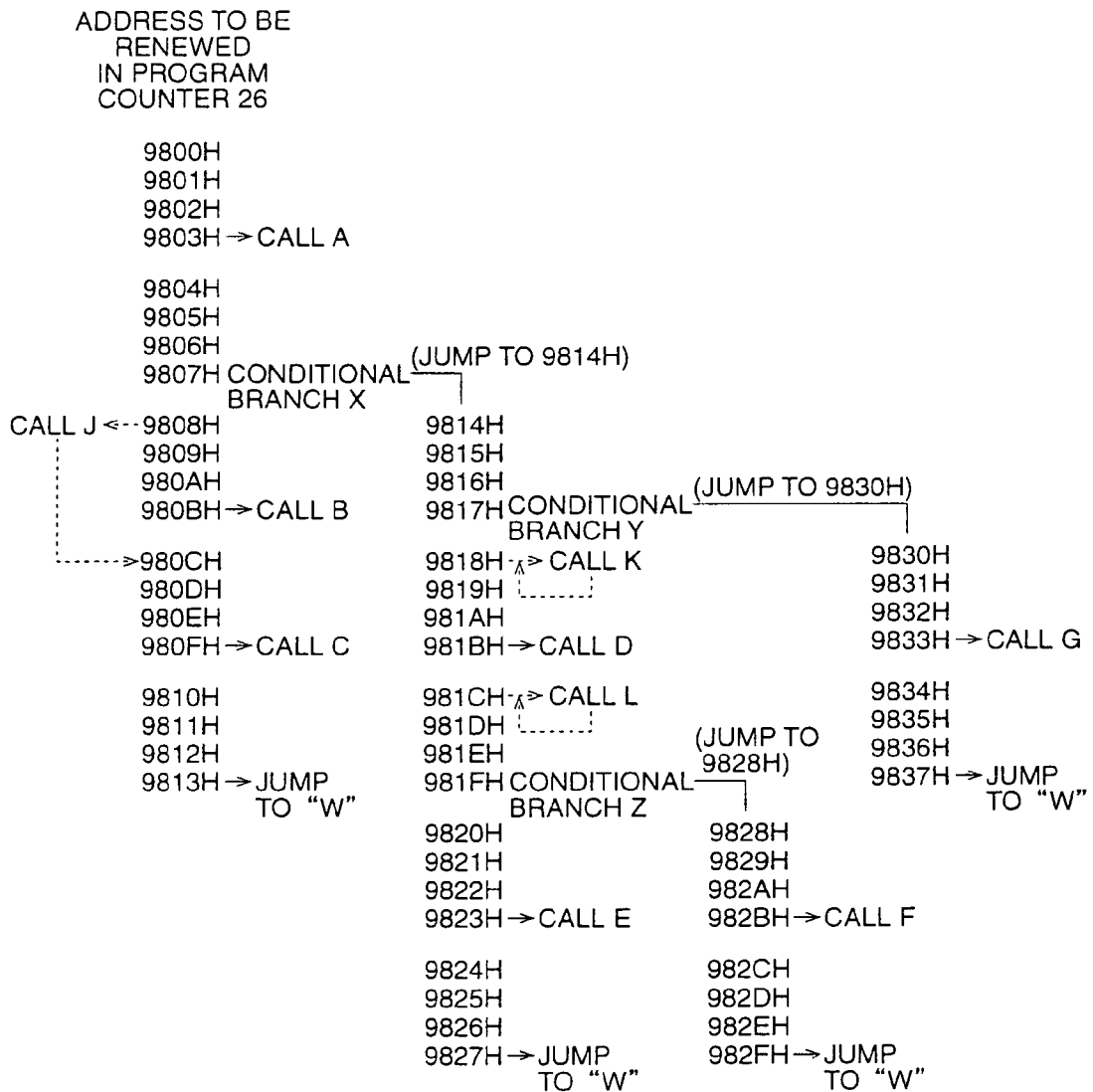
FIG. 29 is a view conceptually showing relationships between addresses successively renewed in a program counter forming a part of the microcomputer according to the present invention and instructions executed in steps 2801 to 2810 of the processing-routine shown in FIG. 28.

FIG. 29 conceptually shows relationships between the addresses successively renewed in the program counter 26 and the instructions executed in steps 2801 to 2810 of the processing-routine of FIG. 28.

During the execution of the processing-routine of FIG. 28, in the microcomputer (FIG. 1), while an instruction stored in a 4-byte address is decoded by the CU 20, four consecutive pieces of 1-byte address are successively renewed in the program counter 26. For example, while the four consecutive addresses 9800H to 9803H are accessed by the CU 20 to decode the instruction for calling and executing the subroutine A, the addresses 9800H to 9803H are successively renewed in the program computer. Thus, while the processing-routine of FIG. 28 is executed, a 1-byte address is successively renewed in the program counter 28 as conceptually shown in FIG. 29.

Figure 30:
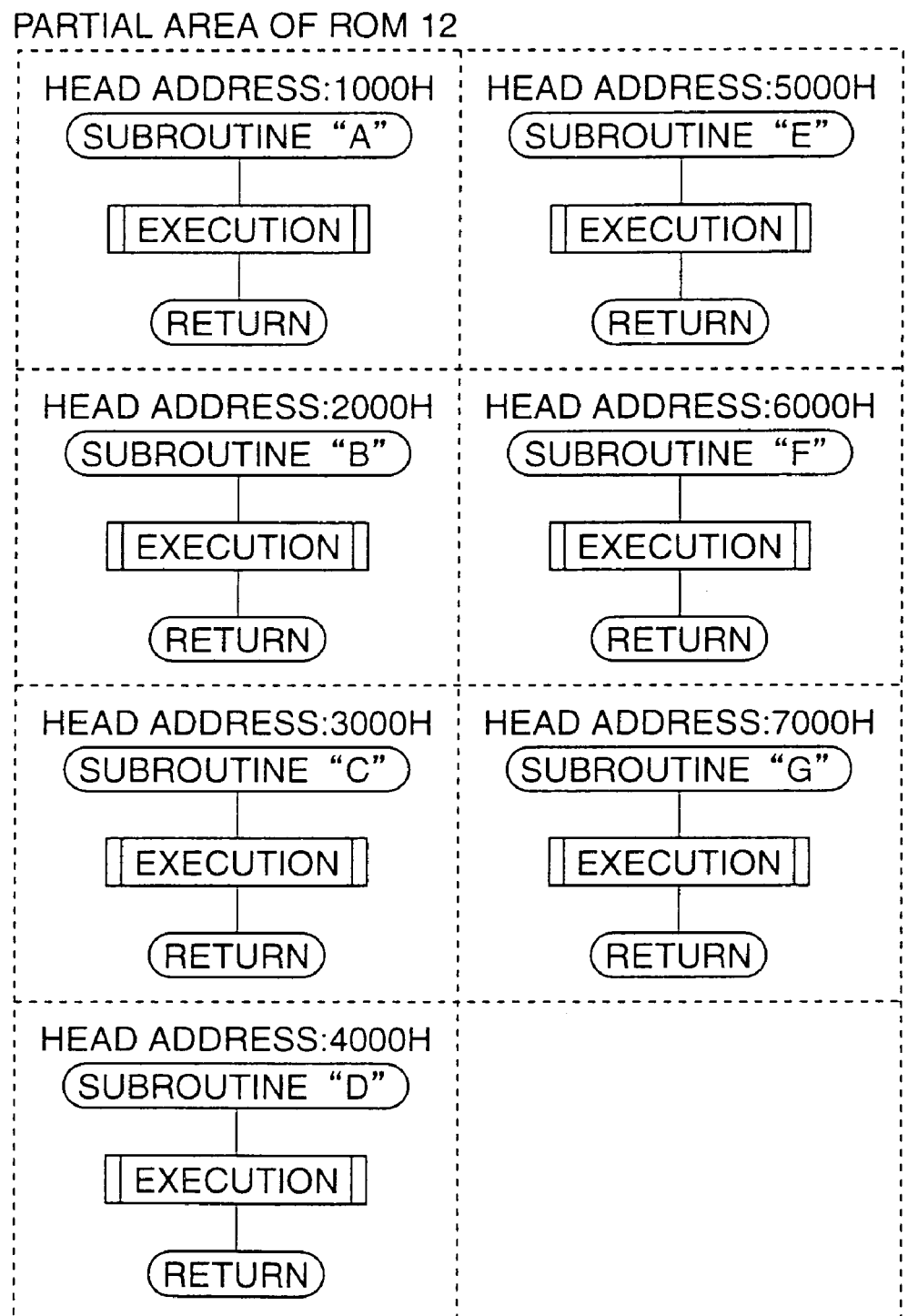
FIG. 30 is a view conceptually showing a partial memory area of a read-only memory (ROM) forming a part of the microcomputer according to the present invention.

On the other hand, the subroutines A, B, C, D, E, F and G, which are executed in steps 2801, 2803, 2804, 2806, 2808, 2809 and 2810, respectively, are stored in the ROM 12, as conceptually shown in FIG. 30.

As is apparent from FIG. 30, the subroutine A is stored as a program composed of a series of instructions in the ROM 12 at the head address 1000H and addresses following the same; the subroutine B is stored as a program composed of a series of instructions in the ROM 12 at the head address 2000H and addresses following the same; the subroutine C is stored as a program composed of a series of instructions in the ROM 12 at the head address 3000H and addresses following the same; the subroutine D is stored as a program composed of a series of instructions in the ROM 12 at the head address 4000H and addresses following the same; the subroutine E is stored as a program composed of a series of instructions in the ROM 12 at the head address 5000H and addresses following the same; the subroutine F is stored as a program composed of a series of instructions in the ROM 12 at the head address 6000H and addresses following the same; and the subroutine G is stored as a program composed of a series of instructions in the ROM 12 at the head address 7000H and addresses following the same.

In the processing-routine of FIG. 28, for example, if these are bugs in the program of the subroutine B, as the aforesaid first revision example, a revisional or proper program, which should be substituted for the program of the subroutine B, is prepared and stored in the program-storage area of the EEPROM 18 (step 2704). At this time, the first 1-byte address 9808 H of the 4-byte address, in which the instruction for calling the subroutine B is stored, is written as a comparison address data $CA0[CA0_{00}, CA0_{01}, \ldots CA0_{14}, CA0_{15}]$ in the comparison-address-storage zone CAZ0 of the EEPROM 18. Also, a head address (e.g. 0600H) of the proper programs, when being read from the EEPROM 18 and being stored in the RAM 14, is written as a vector address $VA0[VA0_{00}, VA0_{01}, \ldots VA0_{14}, VA0_{15}]$ in the vector-address-storage zone VAZ0 corresponding to the comparison-address-storage zone CAZ0. Further, a setting of "1" is given to the flag data FE0 corresponding to the address data CA0 and VA0.

Also, in the processing-routine of FIG. 28, for example, if an additional routine should be executed just before the execution of the subroutine D, as the aforesaid second example, an additional program for the additional routine is prepared and stored in the program-storage area of the EEPROM 18 (step 2704). At this time, the first 1-byte address 9818H of the 4-byte address, in which the instruction for calling the subroutine D is stored, is written as a comparison address data $CA1[CA1_{00}, CA1_{01}, \ldots CA1_{14}, CA1_{15}]$ in the comparison-address-storage zone CAZ1 of the EEPROM 18. Also, a head address (e.g. 0800H) of the additional program, when being read from the EEPROM 18 and being stored in RAM 14, is written as a vector address $VA1[VA1_{00}, VA1_{01}, \ldots VA1_{14}, VA1_{15}]$ in the vector-address-storage zone VAZ1 corresponding to the comparison-address-storage zone CAZ1. Further, a setting of "1" is given to the flag data FE1 corresponding to the address data CA1 and VA1.

Further, in the processing-routine of FIG. 28, for example, if the subroutine G should be executed just before the execution of the subroutine E, as the aforesaid third example, a call program for calling the subroutine G is prepared and stored in the program-storage area of the EEPROM 18 (step 2704). At this time, the first 1-byte address 9820H of the 4-byte address, in which the instruction for calling the subroutine E is stored, is written as a comparison address data $CA2[CA2_{00}, CA2_{01}, \ldots CA2_{14}, CA2_{15}]$ in the comparison-address-storage zone CAZ2 of the EEPROM 18. Also, a head address (e.g. 0A00H) of the call program, when being read from the EEPROM 18 and being stored in RAM 14, is written as a vector address $VA2[VA2_{00}, VA2_{01}, \ldots VA2_{14}, VA2_{15}]$ in the vector-address-storage zone VAZ2 corresponding to the comparison-address-storage zone CAZ2. Further, a setting of "1" is given to the flag data FE2 corresponding to the address data CA2 and VA2.

Figure 31:
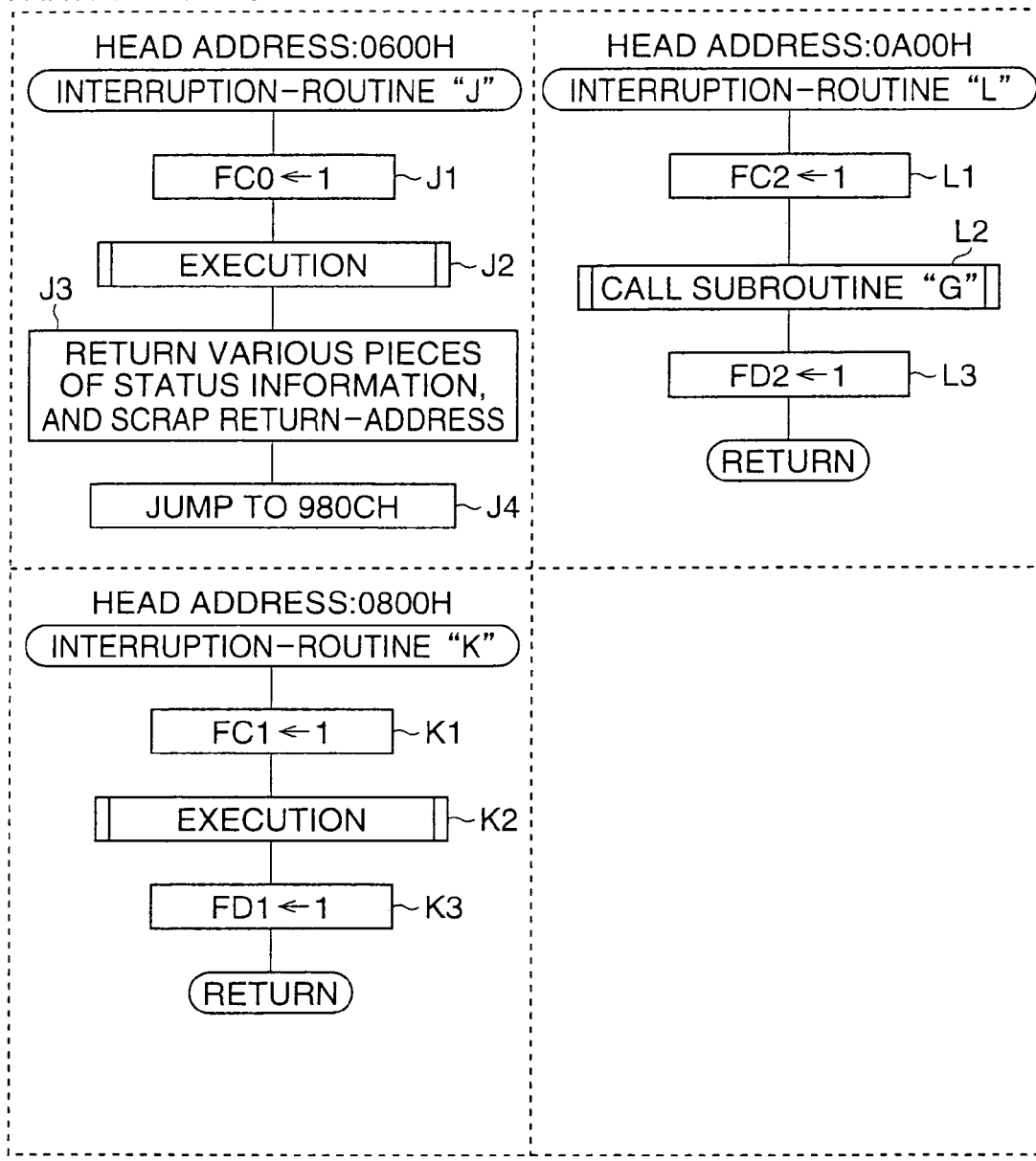
FIG. 31 is a view conceptually showing a part of a program-storage area of the RAM.

As stated hereinbefore, during the system operation routine of FIG. 27, the proper, additional and call programs are read from the program-storage area of the EEPROM 18, and are written in the program-storage area of the RAM 14 (step 2707). Each of these revisional programs is stored as an interruption-routine in the RAM 14, as conceptually shown in FIG. 31. In particular, the proper program is stored as an interruption-routine J in the RAM 14 at a series of addresses including the head address 0600H, at which a first instruction of the proper program is stored; the additional program is stored as an interruption-routine K in the RAM 14 at a series of addresses including the head address 0800H, at which a first instruction of the additional program; and the call program is stored as an interruption-routine L in the RAM 14 at a series of addresses including the head address 0A00H, at which a first instruction of the call program is stored.

Also, during the system operation routine of FIG. 27, the respective comparison address data CA0, CA1, ... CA6 and CA7 are read from the comparison-address-storage zones CAZ0, CAZ1, ... CAZ6 and CAZ7 of the EEPROM 18, and are then written in the CAR's 50 of the circuit elements $48_n$; the respective vector address data VA0, VA1, ... VA6 and VA7 are read from the vector-address-storage zones VAZ0, VAZ1, ... VAZ6 and VAZ7 of the EEPROM 18, and are then written in the VAR's 70 of the circuit elements $48_n$; and the respective flag data FE0, FE1, ... FE6 and FE7 are read from the eight flag-data-storage zones of the EEPROM 18, and are then written in the ACIAR's 68 of the circuit elements $48_n$ (step 2708).

Of course, in this case, the respective comparison address data CA0, CA1 and CA2 correspond to the addresses 9808H, 9818H and 9820H; the respective vector address data VA0, VA1 and VA2 correspond to the addresses 0600H, 0800H and 0A00H; and the setting of "1" is given to only the flag data FE0, FE1 and FE2. On the other hand, each of the comparison address data CA3, CA4, CA5, CA6 and CA7 is held as a certain 16-bit data in a CAR 50 of a corresponding circuit element ($48_3$, $48_4$, $48_5$, $48_6$, $48_7$); each of the vector address data VA3, VA4, VA5, VA6 and VA7 is held as a certain 16-bit data in a VAR 70 of a corresponding circuit element ($48_3$, $48_4$, $48_5$, $48_6$, $48_7$); and the setting of "0" is given to each of the flag data FE3, FE4, FE5, FE6 and FE7.

An operation of the CPU 10 based on the first revision example is explained below.

An address is successively renewed in the program counter 26. When a renewed address reaches the first 1-byte address 9808H of the 4-byte address at which the instruction for calling the subroutine B is stored, i.e. when the renewed address 9808H coincides with the comparison address data CAO held in the CAR 50 of the circuit element $48_0$, an address-coincidence (AC) signal is output as a high level signal from the address comparator 50 of the circuit element $48_0$, whereby an address-coincidence-interruption-requiring (ACIR) signal is output from the output put terminal Q of the flip-flop 62. Thus, an address-coincidence-interruption (ACI) signal is output from the AND-gate 66 of the circuit element $48_0$, because an address-coincidence-interruption-allowing (ACIA) signal is output from the ACIAR 68 to the AND-gate 66 due to the setting of "1" being given to the flag data FE0.

When the ACI signal, output from the AND-gate 66 of the circuit element $48_0$, is input to the interruption controller 40, the sequential-interruption-transition processing (FIG. 21) is executed by the CU 20 of the CPU 10 without making an access to the 4-byte address (9808H to 980BH) at which the instruction for calling the subroutine B is stored. Namely, the address 9808H of the program counter 26 is temporarily stored as a return-address in the stack memory area of the RAM 14 (FIG. 12), and the various flag data (such as the carry flag, the overflow flag, the zero flag, and sign flag and so on) of the status register 38 are temporarily stored in the stack memory area of the RAM 14. Further, the vector address data VA0 (0600H), held in the VAR 70 of the circuit element $48_0$, is set in the program counter 26. Thus, an access is made by the CU 20 to the head address 0600H of the interruption-routine J, resulting in an execution of the interruption-routine J.

Note, as stated hereinbefore, in the execution of the sequential-interruption-transition processing (FIG. 21), the interruption-allowing flag, held in the status register 38, is made to be "0", whereby all the interruptions are prohibited except for a non-maskable interruption (NMI) and a software interruption.

In the execution of the interruption-routine J, first, at step J1, a setting of "1" is given to the flag data FC0 (FIG. 13) held in the ACICR 74 of the circuit element $48_0$, and thus a clear signal CL is output from the ACICR 74 to the reset circuit 72. When the clear signal CL is input to the reset circuit 72, a reset signal RE2 is output from the reset circuit 72 to the reset terminal R of the flip-flop 63 in the aforesaid manner (FIGS. 22 and 23), whereby the flip-flop 62 is unlatched so that the outputting of ACIR signal from the output terminal Q of the flip-flop 62 comes to a standstill. After the outputting of the reset signal RE2, a reset signal RE3 is output from the reset circuit 72 to the ACICR 74, whereby the flag data FC0 of the ACICR 74 is returned from "1" to "0".

At step J2, a revisional routine is executed in accordance with the proper program, which is substituted for the subroutine B including the bugs. When the execution of the revisional routine is completed, the control proceeds to step J3, in which the various pieces of status information are returned. Namely, the various flag data, temporarily stored in the stack memory area of the RAM 14, are returned to the status register 38, and the interruption-allowing flag, held in the status register 38, is made to be "1", whereby all the interruptions are again allowed. Further, at step J3, the return-address, temporarily stored in the stack memory area of the RAM 14, is scrapped without being returned to the program counter 26.

At step J4, the control jumps to the first 1-byte address 980CH of the 4-byte address at which the instruction for calling the subroutine C is stored, whereby an access is made by the CU 20 to the address 980CH, resulting in an execution of the subroutine C. At this time, of course, the address 980CH is set in the program counter 26.

Accordingly, after the production of the microcomputer (FIG. 1), although bugs are unfortunately found in a program of the ROM-stored programs, it is possible to virtually make a revision of the program including the bugs, whereby the whole of the ROM-stored programs can properly function.

An operation of the CPU 10 based on the second revision example is explained below.

When an address, which is successively renewed in the program counter 26, reaches the first 1-byte address 9818H of the 4-byte address at which the instruction for calling the subroutine D is stored, i.e. when the renewed address 9818H coincides with the comparison address data CA1 held in the CAR 50 of the circuit element $48_1$, an address-coincidence (AC) signal is output as a high level signal from the address comparator 50 of the circuit element $48_1$, whereby an address-coincidence-interruption-requiring (ACIR) signal is output from the output put terminal Q of the flip-flop 62. Thus, an address-coincidence-interruption (ACI) signal is output from the AND-gate 66 of the circuit element $48_1$, because an address-coincidence-interruption-allowing (ACIA) signal is output from the ACIAR 68 to the AND-gate 66 due to the setting of "1" being given to the flag data FE1.

When the ACI signal, output from the AND-gate 66 of the circuit element $48_1$, is input to the interruption controller 40, the sequential-interruption-transition processing (FIG. 21) is executed by the CU 20 of the CPU 10 without making an access to the 4-byte address (9818H to 981BH) at which the instruction for calling the subroutine D is stored. Namely, the address 9818H of the program counter 26 is temporarily stored as a return-address in the stack memory area of the RAM 14 (FIG. 12), and the various flag data (such as the carry flag, the overflow flag, the zero flag, the sign flag and so on) of the status register 38 are temporarily stored in the stack memory area of the RAM 14. Further, the vector address data VA1 (0800H), held in the VAR 70 of the circuit element $48_1$, is set in the program counter 26. Thus, an access is made by the CU 20 to the head address 0800H of the interruption-routine K, resulting in an execution of the interruption-routine K.

Note, similar to the first revision example, in the execution of the sequential-interruption-transition processing (FIG. 21), the interruption-allowing flag, held in the status registers 38, is made to be "0", whereby all the interruptions are prohibited except for a non-maskable interruption (NMI) and a software interruption.

In the execution of the interruption-routine K, first, at step K1, a setting of "1" is given to the flag data FC1 (FIG. 14) held in the ACICR 74 of the circuit element $48_1$, and thus a clear signal CL is output from the ACICR 74 to the reset circuit 72. When the clear signal CL is input to the reset circuit 72, a reset signal RE2 is output from the reset circuit 72 to the reset terminal R of the flip-flop 63 in the aforesaid manner (FIGS. 22 and 23), whereby the flip-flop 62 is unlatched so that the outputting of ACIR signal from the output terminal Q of the flip-flop 62 comes to a standstill. After the outputting of the reset signal RE2, a reset signal RE3 is output from the reset circuit 72 to the ACICR 74, whereby the flag data FC1 of the ACICR 74 is returned from "1" to "0".

At step K2, a revisional or additional routine is executed in accordance with the additional program. When the execution of the additional routine is completed, the control proceeds to step K3, in which a setting of "1" is given to the flag data FD1 held in the ACIPR 58 of the circuit element $48_1$.

Thereafter, the CU 20 of the CPU 10 executes the sequential-interruption-return processing (FIG. 24) based on an interruption-return instruction, which is written as a last instruction in the additional program. Namely, the various flag data, temporarily stored in the stack memory area of the RAM 14, are returned to the status register 38, and the interruption-allowing flag, held in the status register 38, is made to be "1", whereby all the interruptions are again allowed. Further, the return-address 9818H, temporarily stored in the stack memory area of the RAM 14, is returned to and set in the program counter 26, resulting in an execution of the subroutine D.

It is to be noted that, when the return-address 9818H is returned and set in the program 26, an address-coincidence (AC) signal is again output from the address comparator 50 of the circuit element $48_1$, because there is the coincidence between the return-address 9818H and the comparison address data CA1 held in the CAR 50 of the circuit element $48_1$. Nevertheless, an outputting of an address-coincidence-interruption-requiring (ACIR) signal from the output put terminal Q of the flip-flop 62 is prevented, due to the setting of "1" being given to the flag data FD1 of the ACIPR 58 (step K3). Thus, an outputting of an address-coincidence-interruption (ACI) signal from the AND-gate 66 of the circuit element $48_1$ to the interruption controller 40 is prohibited.

Also, as is apparent from the explanation made with reference to FIGS. 25 and 26, when the return-address 9818H is renewed by the address 9819B in the program counter 26, the outputting of the AC signal from the address comparator 50 of the circuit element $48_1$ comes to a standstill, whereby the flag data FD1 is reset to be "0".

An operation of the CPU 10 based on the third revision example is explained below.

When an address, which is successively renewed in the program counter 26, reaches the first 1-byte address 9820H of the 4-byte address at which the instruction for calling the subroutine E is stored, i.e. when the renewed address 9820H coincides with the comparison address data CA2 held in the CAR 50 of the circuit element $48_2$, an address-coincidence (AC) signal is output as a high level signal from the address comparator 50 of the circuit element $48_2$, whereby an address-coincidence-interruption-requiring (ACIR) signal is output from the output put terminal Q of the flip-flop 62. Thus, an address-coincidence-interruption (ACI) signal is output from the AND-gate 66 of the circuit element $48_2$, because an address-coincidence-interruption-allowing (ACIA) signal is output from the ACIAR 68 to the AND-gate 66 due to the setting of "1" being given to the flag data FE2.

When the ACI signal, output from the AND-gate 66 of the circuit element $48_1$, is input to the interruption controller 40, the sequential-interruption-transition processing (FIG. 21) is executed by the CU 20 of the CPU 10 without making an access to the 4-byte address (9820H to 9823H) at which the instruction for calling the subroutine E is stored. Namely, the address 9820H of the program counter 26 is temporarily stored as a return-address in the stack memory area of the RAM 14 (FIG. 12), and the various flag data (such as the carry flag, the overflow flag, the zero flag, the sign flag and so on) of the status register 38 are temporarily stored in the stack memory area of the RAM 14. Further, the vector address data VA2 (0A00H), held in the VAR 70 of the circuit element $48_2$, is set in the program counter 26. Thus, an access is made by the CU 20 to the head address 0A00H of the interruption-routine L, resulting in an execution of the interruption-routine L.

Note, similar to the first revision example, in the execution of the sequential-interruption-transition processing (FIG. 21), the interruption-allowing flag, held in the status register 38, is made to be "0", whereby all the interruptions are prohibited except for a non-maskable interruption (NMI) and a software interruption.

In the execution of the interruption-routine L, first, at step L1, a setting of "1" is given to the flag data FC2 (FIG. 15) held in the ACICR 74 of the circuit element $48_2$, and thus a clear signal CL is output from the ACICR 74 to the reset circuit 72. When the clear signal CL is input to the reset circuit 72, a reset signal RE2 is output from the reset circuit 72 to the reset terminal R of the flip-flop 63 in the aforesaid manner (FIGS. 22 and 23), whereby the flip-flop 62 is unlatched so that the outputting of ACIR signal from the output terminal Q of the flip-flop 62 comes to a standstill. After the outputting of the reset signal RE2, a reset signal RE3 is output from the reset circuit 72 to the ACICR 74, whereby the flag data FC2 of the ACICR 74 is returned from "1" to "0".

At step L2, the subroutine G having the head address 7000H is called and executed. When the execution of the subroutine G is completed, the control proceeds to step L3, in which a setting of "1" is given to the flag data FD2 held in the ACIPR 58 of the circuit element $48_2$.

Thereafter, the CU 20 of the CPU 10 executes the sequential-interruption-return processing (FIG. 24) based on an interruption-return instruction, which is written as a last instruction in the call program. Namely, the various flag data, temporarily stored in the stack memory area of the RAM 14, are returned to the status register 38, and the interruption-allowing flag, held in the status register 38, is made to be "1", whereby all the interruptions are again allowed. Further, the return-address 9820H, temporarily stored in the stack memory area of the RAM 14, is returned to and set in the program counter 26, resulting in an execution of the subroutine E.

Note, similar to the second revision example, when the return-address 9820H is returned and set in the program 26, an address-coincidence (AC) signal is again output from the address comparator 50 of the circuit element $48_2$, because there is the coincidence between the return-address 9820H and the comparison address data CA2 held in the CAR 50 of the circuit element $48_2$. Nevertheless, an outputting of an address-coincidence-interruption-requiring (ACIR) signal from the output put terminal Q of the flip-flop 62 is prevented, due to the setting of "1" being given to the flag data FD2 of the ACIPR 58 (step L3). Thus, an outputting of an address-coincidence-interruption (ACI) signal from the AND-gate 66 of the circuit element $48_2$ to the interruption controller 40 is prohibited.

Also, as is apparent from the explanation made with reference to FIGS. 25 and 26, when the return-address 9820H is renewed by the address 9821H in the program counter 26, the outputting of the AC signal from the address comparator 50 of the circuit element $48_2$ comes to a standstill, whereby the flag data FD2 is reset to be "0".

Although the ACIMR 64 does not directly participate in the revision of the ROM-stored programs, this register (ACIMR) can be advantageously utilized for, for example, debugging the ROM-stored programs. In particular, before the debugging of the ROM-stored programs is performed, eight-addresses are suitably selected from the addresses of ROM-stored programs, and are written in the ACR's 50 of the circuit elements $48_n$, respectively. During the performance of the debugging of the ROM-stored programs, it is monitored whether each of the eight flag data FM0, FM1, . . . FM6 and FM7 held in the eight ACIMR's 64 is changed from "0" to "1". Thus, it is possible to easily and speedy confirm whether an access is made by the CU 20 of the CPU 10 to each of the suitably-selected addresses, resulting in a facilitation of the performance of the debugging of the ROM-stored programs. Of course, during the performance of the debugging of the ROM-stored programs, a setting of "0" is given to all of the flag data FE0, FE1, . . . FE6 and FE7 of the ACIAR's 68, thereby prohibiting an address-coincidence-interruption (ACI) signal from each of the AND-gates 66 of the circuit elements $48_n$.

Figure 32:
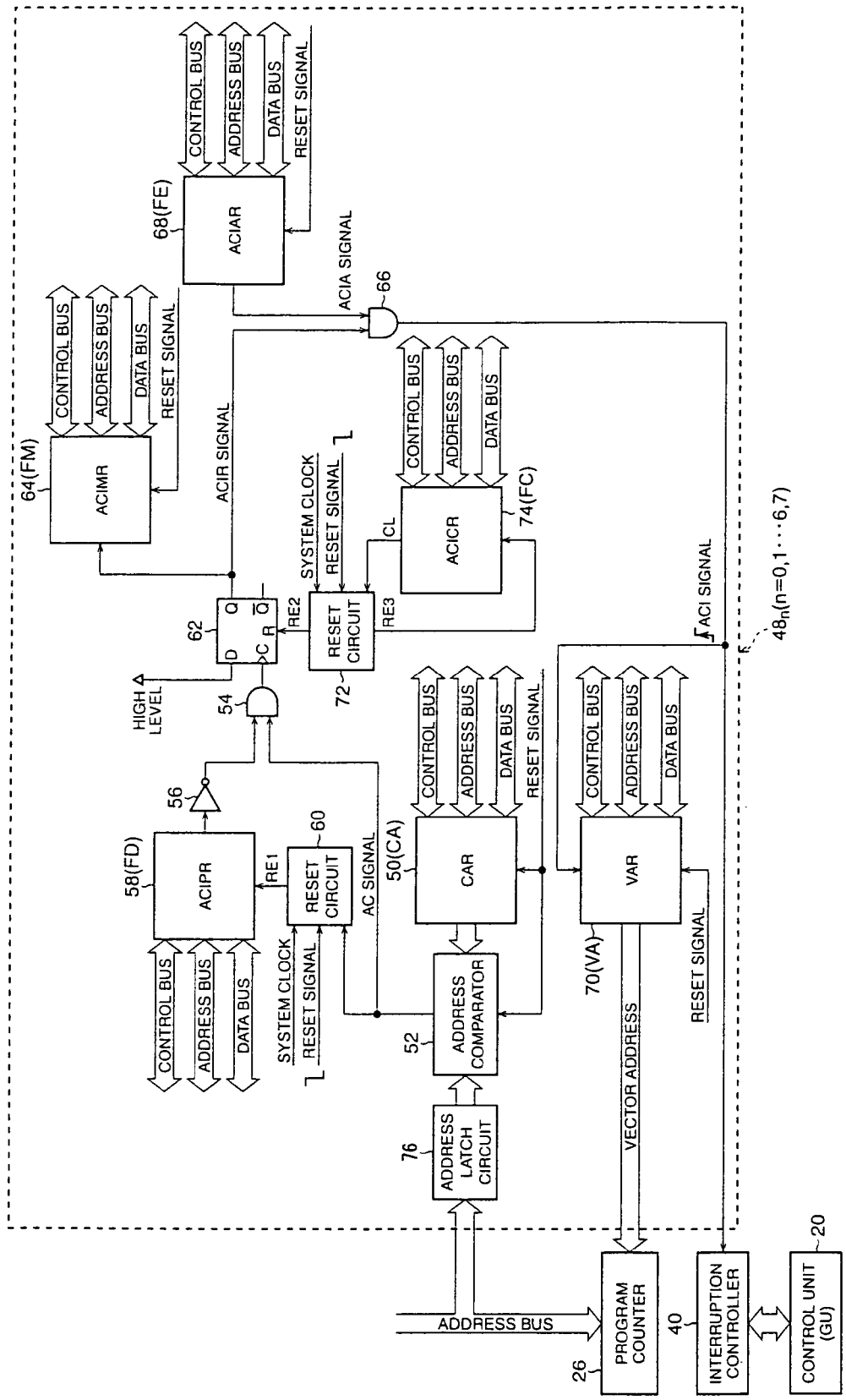
FIG. 32 is a block diagram showing a modification of the representative one of the eight circuit elements included in the address-coincidence-interruption controller (ACIC) of the first embodiment of the microcomputer according to the present invention.

FIG. 32 shows a modification of the circuit element ($48_n$) representatively shown in FIG. 2. In this modification, each of the eight circuit elements $48_n$ includes an address latch circuit 76, through which the address comparator 52 is connected to an address bus extending to the program counter 26. An address, which is successively renewed by the program counter 26, is retrieved from the address bus by the address latch circuit 76, and the retrieved address is then output to the address comparator 52. In short, except for this regard, the modification of FIG. 32 is substantially identical to the circuit element ($48_n$) shown in FIG. 2.

Figure 33:
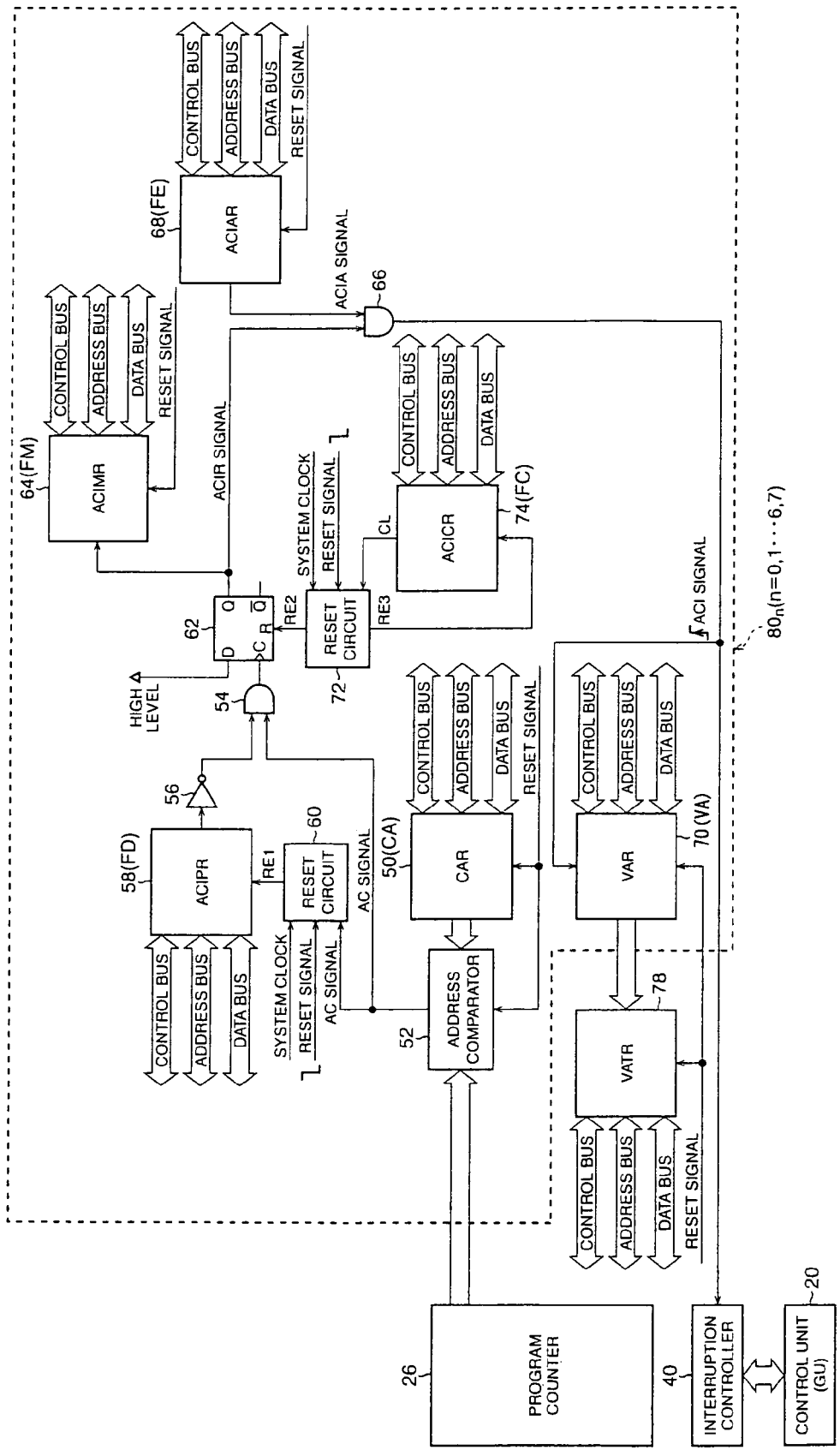
FIG. 33 is a block diagram of a representative one of eight circuit elements included in an address-coincidence-interruption controller (ACIC) forming a part of a second embodiment of the microcomputer according to the present invention.

FIG. 33 respectively shows one of eight circuit elements $80_n$ used in a second embodiment of the microcomputer according to the present invention. Namely, in the second embodiment of the present invention, the address-coincidence-interruption controller (ACIC) 48, shown in FIG. 1, comprises the circuit elements $80_0$, $80_1$, . . . $80_6$ and $80_7$, which are substantially identical to each other. Note, in FIG. 33, the features similar to those of FIG. 2 are indicated by the same references.

Similar to the first embodiment, the number of the circuit elements $80_n$ corresponds to a number of optional locations, at each of which the ROM-stored programs should be revised. Thus, in the second embodiment, it is possible to revise the ROM-stored programs at eight optional locations thereof.

Also, in the second embodiment, the CPU 10 features a vector-address-temporary register (VATR) 78, which forms a part of the ACIC 48, and which is connected to the vector-address register (VAR) 70 of the circuit elements $80_n$. The VATR 78 is formed as a 16-bit register, the bit-number of which is equal to that of an address of the ROM 12. The VATR 78 is suitably connected to the elements of the microcomputer via a control bus, an address bus and a data bus, as shown in FIG. 33, and is initialized by a reset signal when the CPU 10 is powered-ON.

Figure 34:
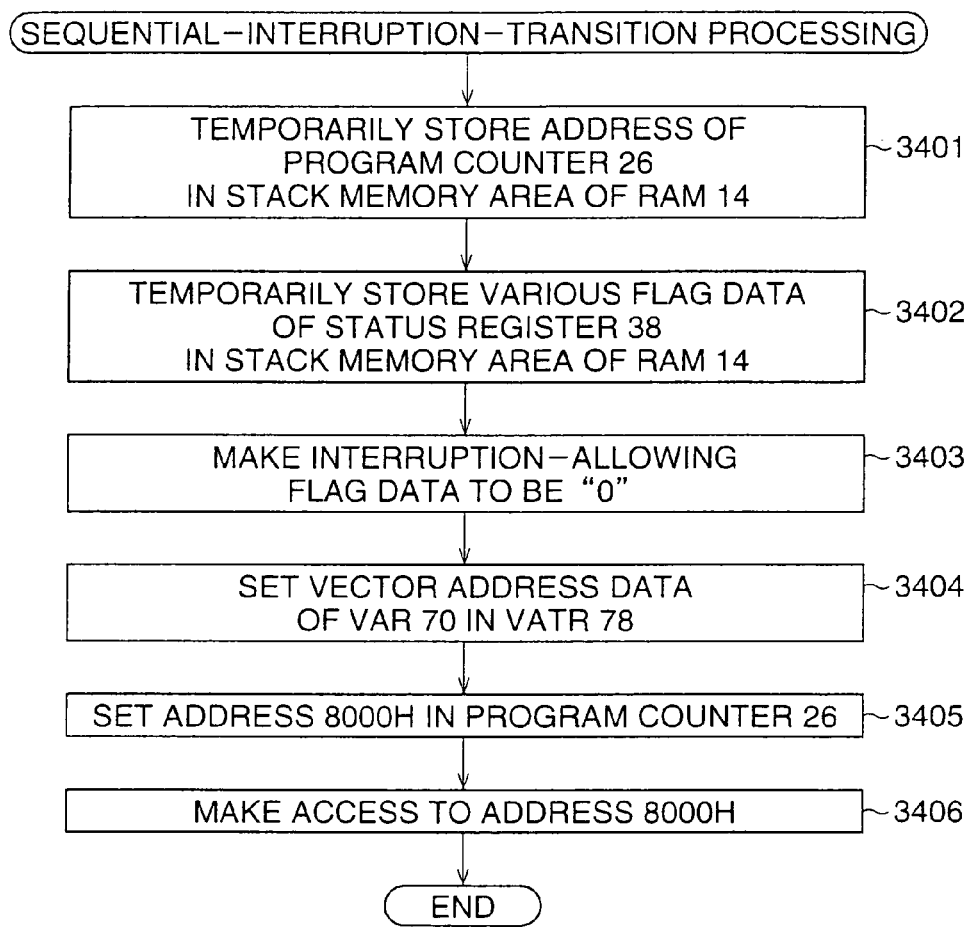
FIG. 34 is a flow chart of a sequential-interruption-transition processing executed by the control unit (CU) of the second embodiment of the microcomputer according to the present invention.
Figure 35:
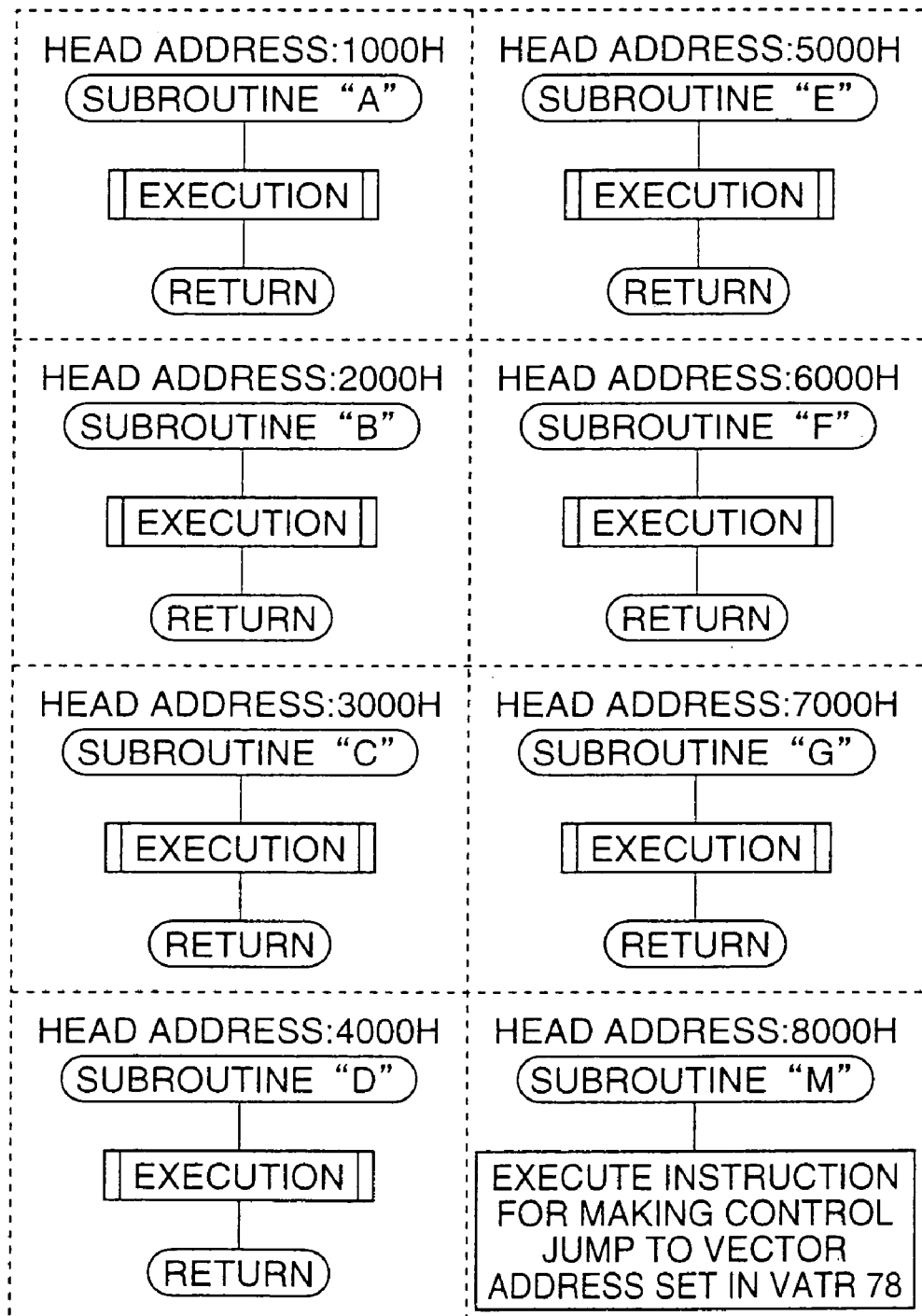
FIG. 35 is a view conceptually showing a partial memory area of the ROM of the second embodiment of the microcomputer according to the present invention.

In the second embodiment, revisions can be made in the ROM-stored programs is substantially the same manner as the first embodiment, except that a sequential-interruption-transition processing is executed in accordance with a flow chart, as shown in FIG. 34, whenever an address-coincidence-interruption (ACI) signal is input from the AND-gate 66 to the interruption controller 40. Thus, in the second embodiment, the aforesaid first, second and third revisions, explained with reference to FIGS. 28 and 29, may be incorporated in the ROM-stored programs provided that an interruption-processing subroutine M is previously stored as a program composed of a series of instructions in the ROM 12 at a head address (e.g. 8000H) and addresses following the same, as shown in FIG. 35.

In the second embodiment, an operation of the CPU 10 based on the first revision example is explained below.

An address is successively renewed in the program counter 26. When a renewed address reaches the first 1-byte address 9808H of the 4-byte address at which the instruction for calling the subroutine B is stored, i.e. when the renewed address 9808H coincides with the comparison address data CAO held in the CAR 50 of the circuit element $80_0$, an address-coincidence (AC) signal is output as a high level signal from the address comparator 50 of the circuit element $80_0$, whereby an address-coincidence-interruption-requiring (ACIR) signal is output from the output put terminal Q of the flip-flop 62. Thus, an address-coincidence-interruption (ACI) signal is output from the AND-gate 66 of the circuit element $80_0$, because an address-coincidence-interruption-allowing (AICA) signal is output from the ACIAR 68 to the AND-gate 66 due to the setting of "1" being given to the flag data FE0.

When the ACI signal, output from the AND-gate 66 of the circuit element $80_0$, is input to the interruption controller 40, the sequential-interruption-transition processing (FIG. 34) is executed by the CU 20 of the CPU 10 without making an access to the 4-byte address (9808H to 980B) at which the instruction for calling the subroutine B is stored.

In particular, at step 3401, an address of the program counter 26, and therefore, the address 9808H is temporarily stored as a return-address in the stack memory area of the RAM 14. Then, at step 3402, and the various flag data (such as the carry flag, the overflow flag, the zero flag, the sign flag and so on) of the status register 38 are temporarily stored in the stack memory area of the RAM 14. Further, at step 3403, the interruption-allowing flag, held in the status register 38, is made to be "0", whereby all the interruptions are prohibited except for a non-maskable interruption (NMI) and a software interruption.

At step 3404, the vector address data VA0 (0600H), held in the VAR 70 of the circuit element $80_0$, is set in the VATR 78, due to the ACI signal being input from the AND-gate 66 to the VAR 70 of the circuit element $80_0$. Then, at step 3405, a vector address, corresponding to the address-coincidence-interruption concerned, is selected from an interruption-vector area defined in the ROM 12, and is then set in the program counter 26. Namely, the head address 8000H of the program of the interruption-processing subroutine M (FIG. 35) is set as the vector address in the program counter 26. Note, various vector addresses are stored in the interruption-vector area of the ROM 12.

When the vector address 8000H is set in the program counter 26, an access is made to the vector address 8000H by the CU 20 of the CPU 10 (step 3406), whereby the control jumps to the vector address 8000H, resulting in an execution of the interruption-processing subroutine M.

As shown in FIG. 35, in the interruption-processing subroutine M, an instruction for making the control jump to a vector address set in the vector-address-temporary register (VATR) 80 is executed, whereby the address of the program counter 26 is renewed by the vector address. Namely, in this first revision example, the vector address VA0 (0600H), held in the VATR 80, is set in the program counter 26. Thus, an access is made to the head address 0600H of the interruption-routine J by the CU 20, resulting in an execution of the interruption-routine J. Namely, the revisional routine is executed in accordance with the proper program (step J2), which is substituted for the subroutine B including the bugs.

After the execution of the interruption-routine J, the control jumps to the first 1-byte address 980CH of the 4-byte address at which the instruction for calling the subroutine C is stored, whereby an access is made by the CU 20 to the address 980CH, resulting in an execution of the subroutine C. At this time, of course, the address 980CH is set in the program counter 26.

In short, similar to the first embodiment, after the production of the microcomputer (FIG. 1), although bugs are unfortunately found in a program of the ROM-stored programs, it is possible to virtually make a revision of the program including the bugs, whereby the whole of the ROM-stored programs can properly function.

In the second embodiment, an operation of the CPU 10 based on the second revision example is explained below.

When an address, which is successively renewed in the program counter 26, reaches the first 1-byte address 9818H of the 4-byte address at which the instruction for calling the subroutine D is stored, i.e. when the renewed address 9818H coincides with the comparison address data CA1 held in the CAR 50 of the circuit element 80$_1$, an address-coincidence (AC) signal is output as a high level signal from the address comparator 50 of the circuit element 80$_1$, whereby an address-coincidence-interruption-requiring (ACIR) signal is output from the output put terminal Q of the flip-flop 62. Thus, an address-coincidence-interruption (ACI) signal is output from the AND-gate 66 of the circuit element 80$_1$, because an address-coincidence-interruption-allowing (ACIA) signal is output from the ACIAR 68 to the AND-gate 66 due to the setting of "1" being given to the flag data FE1.

When the ACI signal, output from the AND-gate 66 of the circuit element 80$_1$, is input to the interruption controller 40, the sequential-interruption-transition processing (FIG. 34) is executed by the CU 20 of the CPU 10 without making an access to the 4-byte address (9818H to 981BH) at which the instruction for calling the subroutine D is stored.

Similar to the above mentioned case, at step 3401, an address of the program counter 26, and therefore, the address 9818H is temporarily stored as a return-address in the stack memory area of the RAM 14. Then, at step 3402, and the various flag data (such as the carry flag, the overflow flag, the zero flag, the sign flag and so on) of the status register 38 are temporarily stored in the stack memory area of the RAM 14. Further, at step 3403, the interruption-allowing flag, held in the status register 38, is made to be "0", whereby all the interruptions are prohibited except for a non-maskable interruption (NMI) and a software interruption.

At step 3404, the vector address data VA1 (0800H), held in the VAR 70 of the circuit element 80$_1$, is set in the VATR 78, due to the ACI signal being input from the AND-gate 66 to the VAR 70 of the circuit element 80$_1$. Then, at step 3405, a vector address, corresponding to the address-coincidence-interruption concerned, is selected from the interruption-vector area defined in the ROM 12, and is then set in the program counter 26. Namely, the head address 8000H of the program of the interruption-processing subroutine M (FIG. 35) is set as the vector address in the program counter 26. Note, various vector addresses are stored in the interruption-vector area of the ROM 12.

When the vector address 8000H is set in the program counter 26, an access is made to the vector address 8000H by the CU 20 of the CPU 10 (step 3406), whereby the control jumps to the vector address 8000H, resulting in an execution of the interruption-processing subroutine M.

As shown in FIG. 35, in the interruption-processing subroutine M, an instruction for making the control jump to a vector address set in the vector-address-temporary register (VATR) 80 is executed, whereby the address of the program counter 26 is renewed by the vector address. Namely, in this second revision example, the vector address VA1 (0800H), held in the VATR 80, is set in the program counter 26. Thus, an access is made to the head address 0800H of the interruption-routine K by the CU 20, resulting in an execution of the interruption-routine K.

After the execution of the interruption-routine K, the sequential-interruption-return processing (FIG. 24) is executed in substantially the same manner as mentioned above. Thus, the RAM-stored programs are virtually revised such that the revisional or additional routine (step K2) is executed in accordance with the additional program just before the execution of the subroutine D.

In the second embodiment, an operation of the CPU 10 based on the third revision example is explained below.

When an address, which is successively renewed in the program counter 26, reaches the first 1-type address 9820H of the 4-byte address at which the instruction for calling the subroutine E is stored, i.e. when the renewed address 9820H coincides with the comparison address data CA2 held in the CAR 50 of the circuit element 80$_2$, an address-coincidence (AC) signal is output as a high level signal from the address comparator 50 of the circuit element 80$_2$, whereby an address-coincidence-interruption-requiring (ACIR) signal is output from the output put terminal Q of the flip-flop 62. Thus, an address-coincidence-interruption (ACI) signal is output from the AND-gate 66 of the circuit element 80$_2$, because an address-coincidence-interruption-allowing (ACIA) signal is output from the ACIAR 68 to the AND-gate 66 due to the setting of "1" being given to the flag data FE2.

When the ACI signal, output from the AND-gate 66 of the circuit element 80$_2$, is input to the interruption controller 40, the sequential-interruption-transition processing (FIG. 34) is executed by the CU 20 of the CPU 10 without making an access to the 4-byte address (9820H to 9823H) at which the instruction for calling the subroutine E is stored.

Similar to the above mentioned case, at step 3401, an address of the program counter 26, and therefore, the address 9820H is temporarily stored as a return-address in the stack memory area of the RAM 14. Then, at step 3402, and the various flag data (such as the carry flag, the overflow flag, the zero flag, the sign flag and so on) of the status register 38 are temporarily stored in the stack memory area of the RAM 14. Further, at step 3403, the interruption-allowing flag, held in the status register 38, is made to be "0", whereby all the interruptions are prohibited except for a non-maskable interruption (NMI) and a software interruption.

At step 3404, the vector address data VA2 (0A00H), held in the VAR 70 of the circuit element 80$_2$, is set in the VATR 78, due to the ACI signal being input from the AND-gate 66 to the VAR 70 of the circuit element 80$_2$. Then, at stop 3405, a vector address, corresponding to the address-coincidence-interruption concerned, is selected from the interruption-vector area defined in the ROM 12, and is then set in the program counter 26. Namely, the head address 8000H of the program of the interruption-processing subroutine M (FIG. 35) is set as the vector address in the program counter 26. Note, various vector addresses are stored in the interruption-vector area of the ROM 12.

When the vector address 8000H is set in the program counter 26, an access is made to the vector address 8000H by the CU 20 of the CPU 10 (step 3406), whereby the control jumps to the vector address 8000H, resulting in an execution of the interruption-processing subroutine M.

As shown in FIG. 35, in the interruption-processing subroutine M, an instruction for making the control jump to a vector address set in the vector-address-temporary register (VATR) 80 is executed, whereby the address of the program counter 26 is renewed by the vector address. Namely, in this third revision example, the vector address VA2 (0A00H), held in the VATR 80, is set in the program counter 26. Thus, an access is made to the head address 0A00H of the interruption-routine K by the CU 20, resulting in an execution of the interruption-routine L.

After the execution of the interruption-routine L, the sequential-interruption-return processing (FIG. 24) is executed in substantially the same manner as mentioned above. Thus, the ROM-stored programs are virtually revised such that the subroutine G (step L2) is executed just before the execution of the subroutine E.

In the aforesaid second embodiment, the interruption-processing subroutine M may include a step in which all the flag data FC0, FC1, . . . FC6 and FC7 of the ACICR's of the circuit elements $80_n$ are made to be "1". Of course, when this step is included in the interruption-processing subroutine M, it is possible to omit the respective steps J1, K1 and L1 from the interruption-routines J, K and L.

Figure 36:
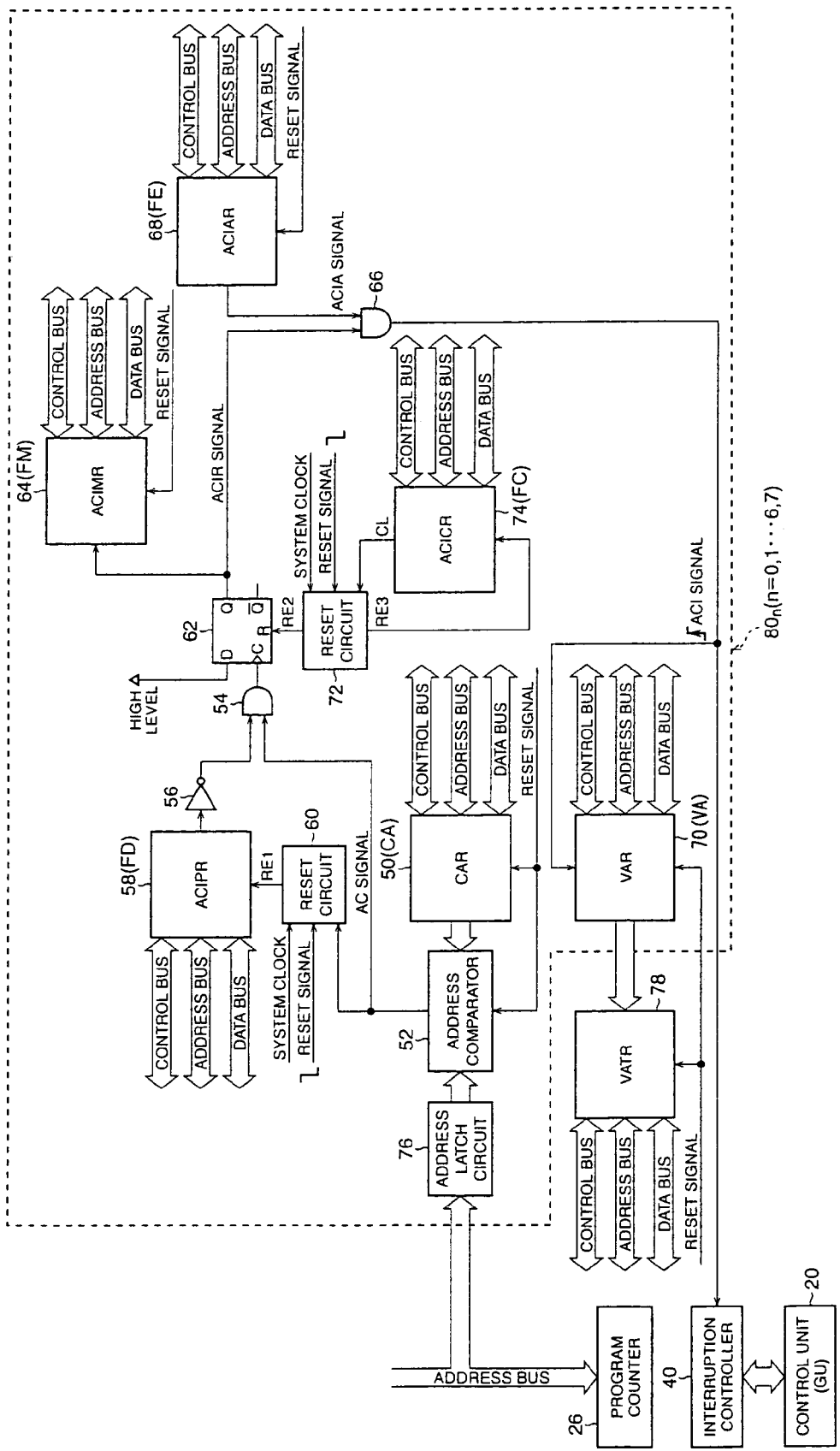
FIG. 36 is a block diagram showing a modification of the representative one of the eight circuit elements included in the address-coincidence-interruption controller (ACIC) of the second embodiment of the microcomputer according to the present invention.

FIG. 36 shows a modification of the circuit element ($80_n$) representatively shown in FIG. 33. Similar to the modification of FIG. 32, in the modification of the second embodiment, each of the eight circuit elements $80_n$ includes an address latch circuit 76, through which the address comparator 52 is connected to an address bus extending to the program counter 26. An address, which is successively renewed by the program counter 26, is retrieved from the address bus by the address latch circuit 76, and the retrieved address is then output to the address comparator 52. In short, except for this regard, the modification of FIG. 36 is substantially identical to the circuit element ($80_n$) shown in FIG. 33.

Although the first, second and third revision examples are referred to in the foregoing, another type of revision may be incorporated in the ROM-stored programs. For example, the ROM-stored programs may be revised such that one of the ROM-stored programs is prevented from being executed.

As is apparent from the foregoing, in the microcomputer according to the present invention, it is possible to make a revision in an optional location of programs stored in a ROM thereof. Thus, not only can a great flexibility be given to a design of a microcomputer, but also a cost for production of microcomputers can be considerably lowered.

Finally, it will be understood by those skilled in the art that the foregoing description is of preferred embodiments of the invention, and that various changes and modifications may be made to the invention without departing from the spirit and scope thereof.

The present disclosure relates to subject matters contained in Japanese Patent Application No. 11-226584 (filed on Aug. 10, 1999) which is expressly incorporated herein, by reference, in its entirety.

What is claimed is:

1. A microcomputer including a read-only memory that stores programs, a controller/calculator that successively accesses addresses of the programs stored in said read-only memory to retrieve and decode an instruction from the accessed addresses, to execute a process based on the decoded instruction, and a program counter in which an address to be accessed by the controller/calculator is successively renewed, said microcomputer comprising:

at least one comparison-address-storage device that stores comparison address data corresponding to an optional address of the programs stored in the read-only memory, at which an interruption-process is executed to virtually revise the programs stored in the read-only memory by adding a program;

a random-access memory that stores a revisional program in which the interruption-process is programmed;

at least one vector-address-storage device that stores vector address data corresponding to a head address of the revisional program stored in said random-access memory;

an address comparator that compares the comparison address data with an address successively renewed in the program counter;

wherein the controller/calculator accesses the head address of the revisional program, stored in said random-access memory, corresponding to the vector address data stored in said vector-address-storage device, when there is a coincidence between the comparison address data and the renewed address of the program counter, resulting in an execution of the interruption-process in accordance with the revisional program;

a return-address-setter that sets return-address data in the program counter to coincide with the comparison address data when execution of the interruption-process in accordance with the revisional program is completed; and an address-coincidence-disabler that disables the coincidence between the comparison address data and the return-address set in the program counter by said return-address-setter in response to a control flag that is set in the revisional program.

2. The microcomputer as set forth in claim 1, further comprising:

a discriminator that discriminates whether the coincidence between the comparison address data and the renewed address of said program counter is proper; and the address-coincidence-disable further disables the coincidence between the comparison address data and the renewed address of the program counter.

3. The microcomputer as set forth in claim 1, further comprising:

a rewritable and non-volatile memory that stores said revisional program, the comparison address data and said vector address data; and a reading/writing system that reads the revisional program, the comparison address data and the vector address data from said rewritable and non-volatile memory, and writes the revisional program, the comparison address data and the vector address data in said random-access memory, said comparison-address-storage device and said vector-address-storage device, respectively, whenever the microcomputer is powered ON.

4. The microcomputer as set forth in claim 1, wherein said address comparator is connected to the program counter to retrieve the renewed address.

5. The microcomputer as set forth in claim 1, wherein said address comparator is connected to an address bus extending to the program counter, to retrieve the renewed address from the program counter.

6. The microcomputer as set forth in claim 1, further comprising a vector-address data setter that reads the vector address data from said vector-address-storage device, and sets the vector-address-data in the program counter, enabling access to the head address of the revisional program by said controller/calculator, and execution of the interruption-process in accordance with the revisional program.

7. The microcomputer as set forth in claim 1, further comprising:

a vector-address-temporary-storage device that receives the vector address data from said vector-address-storage device, when said address comparator determines that there is coincidence between the comparison address data and the renewed address of the program counter; and a vector-address data setter that reads the vector address data from said vector-address-temporary-storage device, and sets the vector-address-data in the program counter, enabling the access to the head address of the revisional program by said controller/calculator and execution of the interruption process in accordance with the revisional program.

* * * * *